(12) United States Patent
Hirose et al.

(10) Patent No.: US 9,715,522 B2
(45) Date of Patent: Jul. 25, 2017

(54) INFORMATION PROCESSING APPARATUS AND CONTROL METHOD

(71) Applicant: FUJITSU LIMITED, Kawasaki-shi, Kanagawa (JP)

(72) Inventors: Atsuhito Hirose, Odawara (JP);
Toshihiro Kawakami, Yokohama (JP);
Akihiro Yamamoto, Yokohama (JP);
Tamaki Tanaka, Numazu (JP);
Toshiaki Yamada, Mishima (JP);
Yuichi Kitamura, Toshima (JP)

(73) Assignee: FUJITSU LIMITED, Kawasaki (JP)

( * ) Notice: Subject to any disclaimer, the term of this patent is extended or adjusted under 35 U.S.C. 154(b) by 354 days.

(21) Appl. No.: 14/658,284

(22) Filed: Mar. 16, 2015

(65) Prior Publication Data
US 2015/0278333 A1 Oct. 1, 2015

(30) Foreign Application Priority Data

Mar. 28, 2014 (JP) ................................ 2014-068221

(51) Int. Cl.
*G06F 17/00* (2006.01)
*G06F 17/30* (2006.01)

(52) U.S. Cl.
CPC .. *G06F 17/30371* (2013.01); *G06F 17/30592* (2013.01)

(58) Field of Classification Search
CPC ................ G06F 17/30371; G06F 17/30592
USPC .......................................................... 707/607
See application file for complete search history.

(56) References Cited

U.S. PATENT DOCUMENTS

| 6,295,610 B1* | 9/2001 | Ganesh | G06F 11/1474 |
| | | | 707/999.202 |
| 7,065,541 B2* | 6/2006 | Gupta | G06F 17/30306 |
| 7,143,307 B1* | 11/2006 | Witte | G06F 11/1435 |
| | | | 714/6.23 |
| 7,328,213 B2* | 2/2008 | Suzuki | G06F 9/466 |
| 7,836,162 B2* | 11/2010 | Miyata | G06F 11/2028 |
| | | | 709/223 |

(Continued)

FOREIGN PATENT DOCUMENTS

| JP | 2000-089993 A | 3/2000 |
| JP | 2006-048103 A | 2/2006 |

(Continued)

OTHER PUBLICATIONS

Das, Sudipto, et al., "Albatross: Lightweight Elasticity in Shared Storage Databases for the Cloud using Live Data Migration", Proc. of the VLDB Endowment, vol. 4, No. 8, Seattle, WA, Aug. 29-Sep. 3, 2011, pp. 494-505.*

(Continued)

*Primary Examiner* — Robert Stevens
(74) *Attorney, Agent, or Firm* — Fujitsu Patent Center

(57) ABSTRACT

A storage unit stores update data corresponding to transactions being executed and indicating updating processes yet to be reflected in a database. A control unit generates a list indicating transactions. When apparatuses executing transactions are switched from an information processing apparatus to another information processing apparatus, the control unit transmits the list to the other information processing apparatus, and migrates the update data to the other information processing apparatus based on the list.

6 Claims, 31 Drawing Sheets

(56) References Cited

U.S. PATENT DOCUMENTS

| | | | |
|---|---|---|---|
| 2006/0026452 A1 | 2/2006 | Suzuki et al. | |
| 2010/0030826 A1* | 2/2010 | Kohno | G06F 11/1662 |
| | | | 707/E17.005 |
| 2010/0211550 A1* | 8/2010 | Daniello | G06F 17/30371 |
| | | | 707/687 |
| 2012/0109805 A1* | 5/2012 | Ramachandra | G06Q 10/10 |
| | | | 705/35 |
| 2012/0153634 A1* | 6/2012 | Williams | F01K 13/00 |
| | | | 290/1 R |
| 2012/0191645 A1 | 7/2012 | Koike et al. | |
| 2012/0278429 A1* | 11/2012 | Miura | G06F 11/2041 |
| | | | 709/217 |

FOREIGN PATENT DOCUMENTS

| | | |
|---|---|---|
| JP | 2010-033398 A | 2/2010 |
| JP | 2012-155499 A | 8/2012 |

OTHER PUBLICATIONS

Madria, Sanjay Kumar, et al., "Mobile data and transaction management", Information Sciences, vol. 141, © 2002, pp. 279-309.*

* cited by examiner

CONFIGURATION FILE 142

| PARAMETER | VALUE | DESCRIPTION |
|---|---|---|
| ClusterServers | SV1, SV2, SV3 | LIST OF DB SERVER |
| StartupTimer | 60 | MAXIMUM WAITING TIME FOR SURVIVAL CONFIRMATION MESSAGE |

FIG. 11

SURVIVING SERVER LIST 143

| SERVER ID | IP ADDRESS | PORT NUMBER | PRIORITY |
|---|---|---|---|
| SV1 | 192.168.12.101 | 80 | 1 |
| SV2 | 192.168.12.102 | 80 | 2 |
| SV3 | 192.168.12.103 | 80 | 3 |

FIG. 12

MESSAGE ⎯144

| FIELD | VALUE |
|---|---|
| CLIENT ID | CL1 |
| CLIENT IP ADDRESS | 192.168.11.101 |
| CLIENT PORT NUMBER | 80 |
| CLIENT PROCESS ID | 4438 |
| CLIENT THREAD ID | 47470217350064 |
| SESSION ID | 102367598 |
| REQUEST TIME | 2013-08-19 15:32:32.225 |
| REQUEST TYPE | SELECT |
| TARGET RESOURCE | TABLE1 |
| INPUT DATA | WHERE COLUMN2 = 5 |

FIG. 13

TRANSACTIONLOG 151

| FIELD | VALUE |
|---|---|
| TRANSACTION ID | 15896231 |
| CLIENT ID | CL1 |
| CLIENT IP ADDRESS | 192.168.11.101 |
| CLIENT PORT NUMBER | 80 |
| SESSION ID | 102367598 |
| START TIME | 2013-08-19 15:33.16.123 |
| TRANSACTION STATE | CONTINUE |
| TRANSACTION TYPE | ReadWrite |
| TARGET RESOURCE | TABLE1 |
| EXCLUSIVE COMPETITOR | SESSION ID = 102367676; CLIENT ID = CL2 |
| CURSOR STATE | OPEN |
| CURSOR POSITION | 101 |
| UPDATE DATA | RESOURSE = TABLE1; COLUMN = PostCode; BEFORE UPDATING = 2118588; AFTER UPDATING = 2220033 |

FIG. 14

MIGRATION LIST

141

| TRANSAC-TION ID | SESSION ID | CLIENT ID | IP ADDRESS | PORT NUMBER | MIGRATION STATE |
|---|---|---|---|---|---|
| 15896231 | 102367598 | CL1 | 192.168.11.101 | 80 | 2 (MIGRATION COMPLETED) |
| 15896233 | 102367600 | CL1 | 192.168.11.101 | 80 | 1 (MIGRATION-IN-PROGRESS) |
| 15896232 | 102367599 | CL2 | 192.168.11.102 | 80 | 0 (YET-TO-BE-MIGRATED) |

FIG. 15

INFORMATION PROCESSING APPARATUS AND CONTROL METHOD

CROSS-REFERENCE TO RELATED APPLICATION

This application is based upon and claims the benefit of priority of the prior Japanese Patent Application No. 2014-068221, filed on Mar. 28, 2014, the entire contents of which are incorporated herein by reference.

FIELD

The embodiments discussed herein relate to an information processing apparatus and a control method.

BACKGROUND

It is often the case that an information processing system used for business includes a database. For example, there is provided a server apparatus (DB server) configured to manage a database, and the DB server receives a processing request from a terminal apparatus or a server apparatus (DB client) configured to execute application software. The DB server performs a process such as searching or updating data in a database according to the received processing request, and returns the processing result to the DB client.

A DB server may treat, as a single transaction, a series of updating processes performed according to a plurality of mutually related processing requests. A transaction has a property (atomicity) ensuring that either all or none of the series of updating processes are performed in the database, and it never happens that only a part of them are performed. Completing a transaction and reflecting the result thereof in the database may be referred to as "commit", whereas cancelling a transaction halfway without reflecting the result thereof in the database may be referred to as "rollback".

For example, the DB server, upon receiving a processing request instructing an updating process, separately stores the details of the updating, without updating the database at that stage. The DB server, upon receiving a commit request belonging to the same transaction as that of the preceding processing request, reflects the held details of the updating in the database. In addition, the DB server, upon receiving a rollback request belonging to the same transaction as that of the preceding processing request, discards the held details of the updating.

Some information processing systems including databases are expected to keep operating for a long time so as not to terminate the business service. On the other hand, there may be a case where the DB server has to be temporarily shut down upon occurrence of failure of the DB server or when maintenance work is performed. Therefore, a redundant DB server may be provided to enhance the availability of the database. For example, two DB servers holding databases storing identical contents are prepared, one of the servers being specified as an active server which executes transactions and the other being specified as a standby server which synchronizes with the database of the active server without directly executing transactions. When a failure occurs in the active server, or when maintenance work of the active server is performed, the DB server executing transactions is switched to the standby server.

With regard to switching of DB servers, the following techniques are proposed, for example.

There is proposed a switching method which switches the host computer executing online transactions from a main host computer to a sub host computer, according to a switching instruction. The switching method waits until a request which has reached the main host computer before issuance of the switching instruction is processed by the main host computer, establishes the database of the main host computer, and updates the database of the sub host computer so that the contents thereof become identical to those of the established database of the main host computer. Requests having reached the main host computer after issuance of the switching instruction are kept waiting in the main host computer, and executed by the sub host computer after update of the database of the sub host computer.

In addition, there is proposed a recovery system which synchronizes the database of the main storage apparatus with the database of the sub storage apparatus for each transaction. In the recovery system, the main storage apparatus, when committing a transaction, transmits a log indicating the details of the updating in the transaction to the sub storage apparatus. The sub storage apparatus updates the database of the sub storage apparatus based on the received log.

In addition, there is proposed a database system which enables maintenance work of the regular system by switching from the regular system to a substitute system. In the database system, newly putting transactions into the regular system is terminated when switching to the substitute system. When a transaction being executed is committed by the regular system, update data of the transaction is transmitted from the regular system to the substitute system and the database of the substitute system is synchronized with that of the regular system. Subsequently, putting new transactions into the substitute system is started upon completion of all the transactions in the regular system.

In addition, there is proposed a database system in which an application server requests both the main DB server and the sub DB server to manipulate data. In the database system, the main DB server and the sub DB server generate logs of data manipulation respectively, and only the main DB server notifies the application server of completion of the data manipulation. Subsequently, when the application server requests the main DB server and the sub DB server to commit a transaction, each of the main DB server and the sub DB server updates the databases based on the log, and only the main DB server notifies the application server of completion of the committing.

Japanese Laid-Open Patent Publication No. 2000-89993
Japanese Laid-Open Patent Publication No. 2006-48103
Japanese Laid-Open Patent Publication No. 2010-33398
Japanese Laid-Open Patent Publication No. 2012-155499

However, in switching apparatuses executing transactions, techniques as proposed in the Japanese Laid-Open Patent Publication No. 2000-89993, Japanese Laid-Open Patent Publication No. 2006-48103, and Japanese Laid-Open Patent Publication No. 2010-33398 may result in causing a temporary increase of the load on the switching destination apparatus. Accordingly, there is a problem that the response performance of database access may worsen at the time of switching.

For example, with the method which waits for completion of a transaction being executed in the switching source apparatus before starting to put a processing request of a new transaction into the switching destination apparatus, a large amount of processing requests accumulated in the course of switching may be put into the switching destination apparatus at a time. Therefore, the load increases immediately after the switching, which may result in a degraded response performance. In addition, there is also conceivable a method which rolls back a transaction being executed in the switching source apparatus and immediately starts putting a processing request into the switching destination apparatus. With this method, however, the transaction rolled back in the switching source apparatus is redone from scratch in the switching destination apparatus, thus temporarily increasing the load on the switching destination apparatus.

On the other hand, with the proposed technique of Japanese Laid-Open Patent Publication No. 2012-155499 which synchronizes intermediate states of a transaction among a plurality of apparatuses, the load on the standby system in normal operation may be approximately as large as that on the active system. Accordingly, there is a problem that a large amount of computational resources are prepared also for the standby system and, in addition, it becomes difficult to effectively use the computational resources of the standby system for other than transaction control.

SUMMARY

According to an aspect, there is provided an information processing apparatus that manages a database, the information processing apparatus including: a memory that stores one or more sets of update data indicating updating processes yet to be reflected in the database and corresponding to one or more transactions being executed; and a processor that performs a process including: generating a list indicating the one or more transactions, transmitting the list to another information processing apparatus when switching apparatuses executing transactions from the information processing apparatus to the other information processing apparatus, and migrating the one or more sets of update data to the other information processing apparatus based on the list.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates an exemplary configuration file;
FIG. 12 illustrates an exemplary list of surviving servers;
FIG. 13 illustrates an exemplary message;
FIG. 14 illustrates an exemplary transaction log;
FIG. 15 illustrates an exemplary migration list.

DESCRIPTION OF EMBODIMENTS

Figure 1:
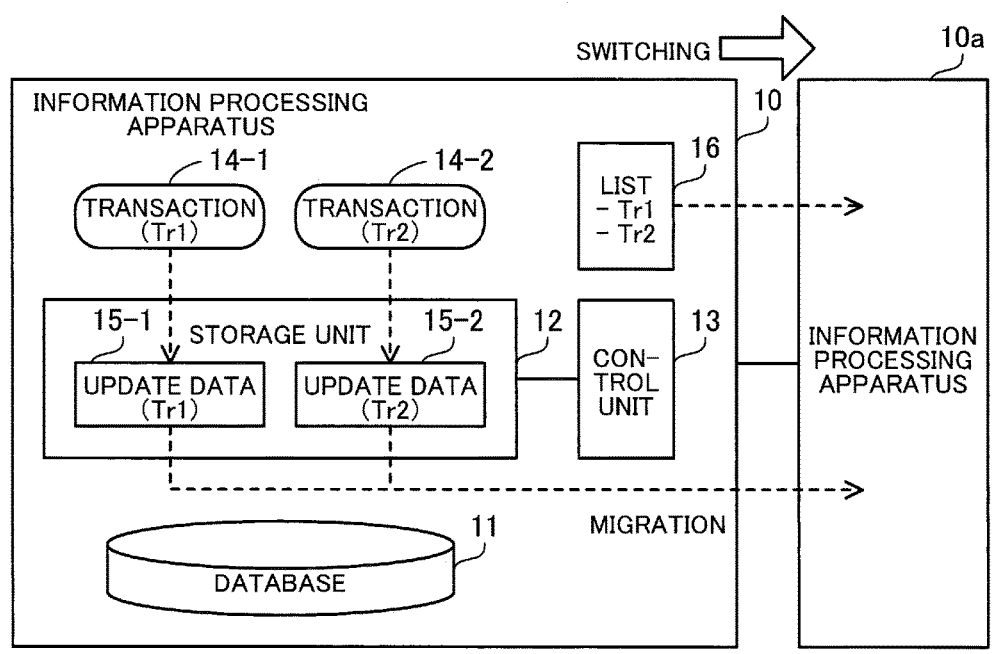
FIG. 1 illustrates an information processing apparatus of a first embodiment.

Several embodiments will be described below with reference to the accompanying drawings, wherein like reference numerals refer to like elements throughout.

First Embodiment

FIG. 1 illustrates an information processing apparatus of a first embodiment.

An information processing apparatus 10 of the first embodiment is included in a redundant configuration database system. The information processing apparatus 10 may be a computer that executes programs of a Database Management System (DBMS). In addition, the information processing apparatus 10 may be a server apparatus that receives processing requests from other information processing apparatuses.

The information processing apparatus 10 manages a database 11. When the database 11 is a Relational Database (RDB), the database 11 includes one or more tables storing data records. The database 11 may be stored in a nonvolatile storage device such as an HDD (Hard Disk Drive) or a volatile storage device such as a RAM (Random Access Memory). The non-volatile or volatile storage device may be provided in the information processing apparatus 10, or may be connected to the outside of the information processing apparatus 10.

The redundant configuration database system further includes an information processing apparatus 10a. The information processing apparatus 10 and the information processing apparatus 10a are communicable via a network.

The information processing apparatus 10a may manage a redundant database to be synchronized with the database 11 so as to store data sets of identical contents. While the information processing apparatus 10 is operating as an active system executing transactions, the information processing apparatus 10a is operating as a standby system which does not execute transactions. However, the active system may be switched from the information processing apparatus 10 to the information processing apparatus 10a. For example, when maintenance work of the information processing apparatus 10 is performed, active system is switched to the information processing apparatus 10a according to an instruction from the administrator.

The information processing apparatus 10 has a storage unit 12 and a control unit 13. The storage unit 12 may be a nonvolatile storage device such as an HDD, or may be a volatile storage device such as a RAM. The control unit 13 is a processor, for example. The processor may be a CPU (Central Processing Unit) or a DSP (Digital Signal Processor), or may include an integrated circuit for specific application such as an ASIC (Application Specific Integrated Circuit) or an FPGA (Field Programmable Gate Array). The processor may be one that executes programs stored in a storage device (e.g., the storage unit 12) such as RAM. In addition, a set of two or more processors (multiprocessor) may be referred to as a "processor".

The storage unit 12 stores update data sets 15-1 and 15-2. The update data set 15-1 corresponds to a transaction 14-1 (Tr1) being executed in the information processing apparatus 10 which has been neither committed nor rolled back, and indicates the details of an updating process which are yet to be reflected in the database 11. Similarly, the update data set 15-2 corresponds to a transaction 14-2 (Tr2) being executed in the information processing apparatus 10, and indicates the details of an updating process which are yet to be reflected in the database 11.

The update data set 15-1 indicates, for example, an instruction to be executed on the database 11, or correspondence between the data sets included in the database 11 before and after updating. When a processing request indicating an updating process for the transaction 14-1 is generated, the update data set 15-1 is generated or updated instead of the database 11 being updated. When a commit request is generated for the transaction 14-1, the database 11 is updated based on the update data set 15-1. On this occasion, two or more tables may be collectively updated. On the other hand, when a rollback request is generated for the transaction 14-1, the update data set 15-1 is discarded without being reflected in the database 11. Similarly, for the update data set 15-2, generation/updating/discarding is performed according to the state of the transaction 14-2.

The control unit 13 generates the list 16 indicating the transactions 14-1 and 14-2 being executed in the information processing apparatus 10. The list 16 includes, for example, identification information of the transactions 14-1 and 14-2. When the active system executing transactions is switched from the information processing apparatus 10 to the information processing apparatus 10a, the control unit 13 transmits a copy of the list 16 to the information processing apparatus 10a. The list 16 may be generated when switching of the active system is instructed, or may be generated before switching is instructed. In the latter case, for example, the information processing apparatus 10 updates the list 16 each time a transaction being executed changes and maintains the latest state.

In addition, when the active system is switched to the information processing apparatus 10a, the control unit 13 migrates the update data sets 15-1 and 15-2 to the information processing apparatus 10a, based on the list 16. For example, the control unit 13 sequentially migrates the update data sets 15-1 and 15-2 and, using the list 16, manages whether or not the update data set of each transaction has been migrated. The control unit 13 may determine the order of migration to the information processing apparatus 10a based on the list 16. When, on this occasion, the information processing apparatus 10 receives a processing request belonging to the transaction 14-2, the control unit 13 may increase the migration priority of the update data set 15-2 and cause the information processing apparatus 10a to perform the process corresponding to the processing request. In addition, when the information processing apparatus 10 has received a processing request belonging to the transaction 14-1 before receiving a switching instruction, the control unit 13 may decrease the migration priority of the update data set 15-1 and keep the migration of the update data of the transaction waiting until execution of the process corresponding to the processing request is completed by the information processing apparatus 10. The information processing apparatus 10a may also manage whether or not the update data of each transaction has been migrated, using the copy of the received list 16.

According to the information processing apparatus 10 of the first embodiment, it becomes possible to hand over the transactions 14-1 and 14-2 being executed to the information processing apparatus 10a using the list 16, when the active system executing transaction is switched to the information processing apparatus 10a. Therefore, it is possible to prevent a large amount of processing requests from concentrating on the information processing apparatus 10a after the active system has been switched, thus reducing the load on the information processing apparatus 10a, in comparison with the case where the transactions 14-1 and 14-2 are once rolled back without being handed over to the information processing apparatus 10a. Accordingly, it becomes possible to suppress degradation of the response performance of the database system and to switch the active system without stopping the database system.

In addition, it suffices to perform a hand over only when switching the active system, in comparison with the case where the states of the transactions 14-1 and 14-2 before committing are successively synchronized between the information processing apparatuses 10 and 10a, and thus the load on the information processing apparatus 10a operating as a standby system may be reduced. Therefore, computational resources (such as CPU resources) of the information processing apparatus 10a operating as a standby system may be used for other processes such as data processing without updating, and thus computational resources may be effectively used.

Second Embodiment

Figure 2:
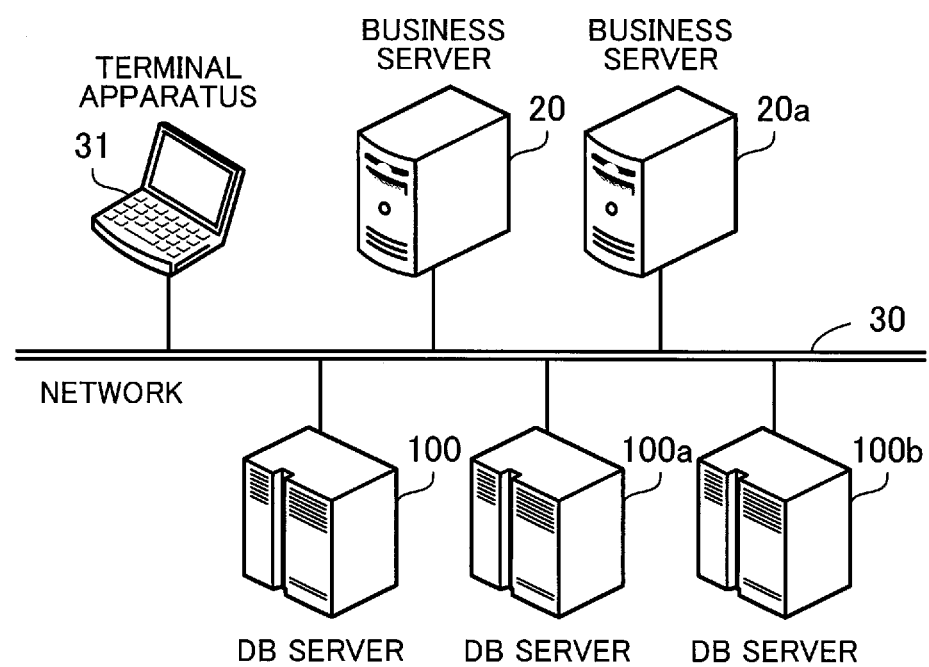
FIG. 2 illustrates a database system of a second embodiment.

FIG. 2 illustrates a database system of a second embodiment.

A database system of the second embodiment has improved the availability of the database by providing a redundant DB server configured to manage the database. The database system has business servers 20 and 20a, a terminal apparatus 31, and DB servers 100, 100a and 100b. The aforementioned apparatuses are connected to a network 30.

The business servers 20 and 20a are server computers that executes application software used for business. When the application software used by the database is operating, the business servers 20 and 20a establish a connection with the DB servers 100, 100a and 100b in advance. The business servers 20 and 20a transmit a message to the DB servers 100, 100a and 100b and receive a processing result from one of the DB servers. The business servers 20 and 20a may be regarded as "DB clients" requesting data processing for the DB servers 100, 100a and 100b. A client computer operated by a user may also be used as a DB client.

The terminal apparatus 31 is a client computer operated by the administrator of the database system. The administrator may perform maintenance work on some of the DB servers 100, 100a and 100b without terminating the business service using the business servers 20 and 20a. The maintenance work may include, for example, updating the software operating on the DB servers 100, 100a and 100b, or replacing the hardware components thereof. Abnormal termination of the business service due to occurrence of failure may be suppressed by performing maintenance on software or hardware of the DB servers 100, 100a and 100b continuously.

When maintenance work is performed, the terminal apparatus 31 transmits, to an active DB server which notifies the business servers 20 and 20a of the processing result, a command that instructs switching of the active DB server. Switching the active DB server according to a command may be referred to as "switchover". When switchover is performed, the switching source DB server disconnects the connection with the business servers 20 and 20a, and stops the DBMS. Accordingly, it is possible to perform maintenance work on the switching source DB server. After the switchover, the switching destination DB server becomes active and notifies the business servers 20 and 20a of processing results. When any abnormality is detected during switchover by heartbeat or the like, switching from the migration source to the migration destination is performed by fail-over, without migration of transactions by use of a list indicating transactions according to the present embodiment.

Each of the DB servers 100, 100a and 100b is a server computer holding a database. The databases of the DB servers 100, 100a and 100b are synchronized so that the data stored therein is the same. When all the DB servers 100, 100a and 100b are operating, one of the DB servers (e.g., DB server 100) is in the active state, whereas the other DB servers (e.g., DB servers 100a, 100b) are in the standby state.

An active DB server performs data processing according to messages from the business servers 20 and 20a and notifies the business servers 20 and 20a of the processing result. The active DB server may execute transactions. On the other hand, a standby DB server neither performs data processing nor notifies the business servers 20 and 20a of the processing result, even when messages from the business servers 20 and 20a have been received. The standby DB server does not directly execute transactions. However, when the database is updated in the active DB server, the standby DB server also updates the database to synchronize the database with the database of the active DB server.

Figure 3:
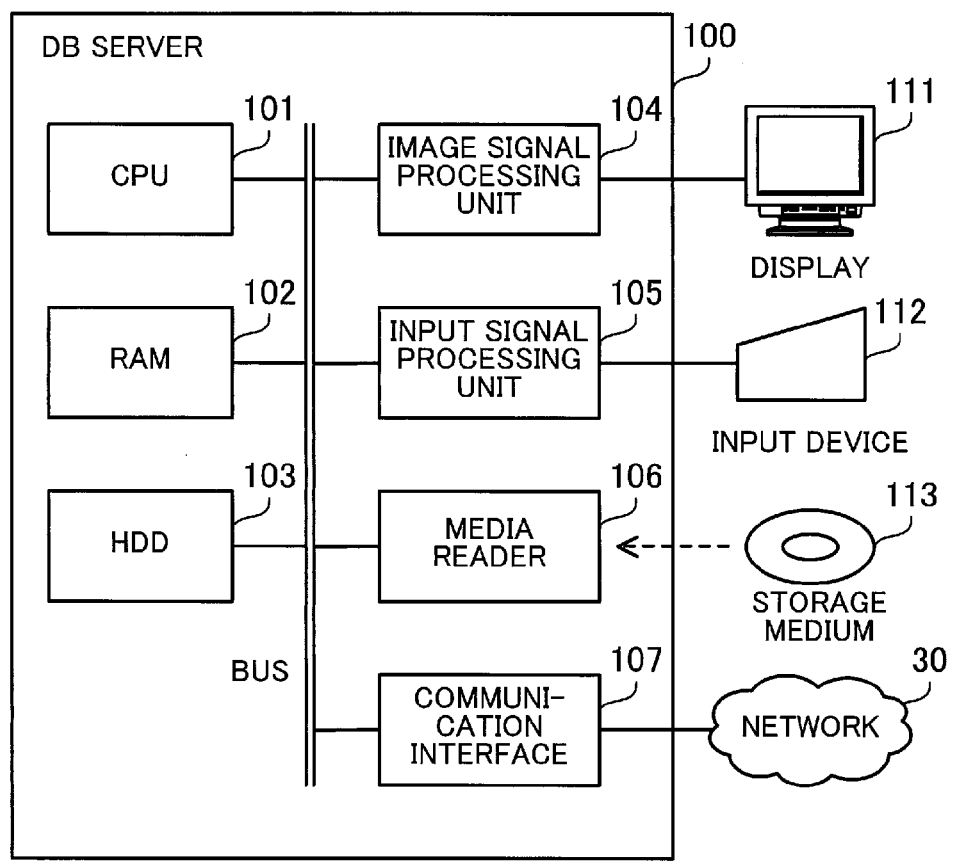
FIG. 3 is a block diagram illustrating an exemplary hardware configuration of a DB server.

FIG. 3 is a block diagram illustrating an exemplary hardware configuration of a DB server.

The DB server 100 has a CPU 101, a RAM 102, an HDD 103, an image signal processing unit 104, an input signal processing unit 105, a media reader 106, and a communication interface 107. The units are connected to a bus. The CPU 101 is an example of the control unit 13 of the first embodiment. The RAM 102 or the HDD 103 is an example of the storage unit 12 of the first embodiment. The business servers 20 and 20a, the terminal apparatus 31, and the DB servers 100a and 100b may also be implemented using hardware similar to that of the DB server 100.

The CPU 101 is a processor including an operation circuit configured to execute program instructions. The CPU 101 loads, to the RAM 102, at least a part of a program or data stored in the HDD 103, and executes the program. The CPU 101 may include a plurality of processor cores, the DB server 100 may include a plurality of processors, and the processes described below may be performed in parallel using the plurality of processors or processor cores. In addition, a set of a plurality of processors (multiprocessor) may be referred to as a "processor".

The RAM 102 is a volatile semiconductor memory that temporarily stores a program to be executed by the CPU 101, or data to be used for operation by the CPU 101. The DB server 100 may include a memory of a type other than a RAM, or may include a plurality of memories.

The HDD 103 is a nonvolatile storage device that stores programs of software such as the OS (Operating System), middleware or application software, and data as well. The DB server 100 may include another type of storage device such as a flash memory or an SSD (Solid State Drive), or may include a plurality of nonvolatile storage devices.

The image signal processing unit 104 outputs an image to a display 111 connected to the DB server 100, according to an instruction from the CPU 101. A CRT (Cathode Ray Tube) display, a Liquid Crystal Display (LCD), a Plasma Display Panel (PDP), an Organic Electro-Luminescence (OEL) display, or the like, may be used as the display 111.

The input signal processing unit 105 acquires an input signal from an input device 112 connected to the DB server 100, and outputs the signal to the CPU 101. A pointing device such as a mouse, a touch panel, a touchpad or a track ball, a keyboard, a remote controller, a button switch, or the like, may be used as the input device 112. In addition, the DB server 100 may have a plurality of types of input devices connected thereto.

The media reader 106 is a reading device that reads programs or data stored in a storage medium 113. A magnetic disk such as, for example, a Flexible Disk (FD) or an HDD, an optical disk such as a CD (Compact Disc) or DVD (Digital Versatile Disc), a Magneto-Optical disk (MO), a semiconductor memory, or the like, may be used as the storage medium 113. The media reader 106 stores, in the RAM 102 or the HDD 103, programs or data which have been read from the storage medium 113, for example.

The communication interface 107, being connected to the network 30, is an interface for communication with the business servers 20 and 20a or the DB servers 100a and 100b, via the network 30. The communication interface 107 may be a wired communication interface connected to communication apparatuses using a cable, or may be a wireless communication interface wirelessly connected to a base station.

In addition, the DB server 100 need not include the media reader 106 and, when controllable from a user-operated terminal apparatus, need not include the image signal processing unit 104 and the input signal processing unit 105. In addition, the display 111 and the input device 112 may be integrally formed with the housing of the DB server 100.

Figure 4:
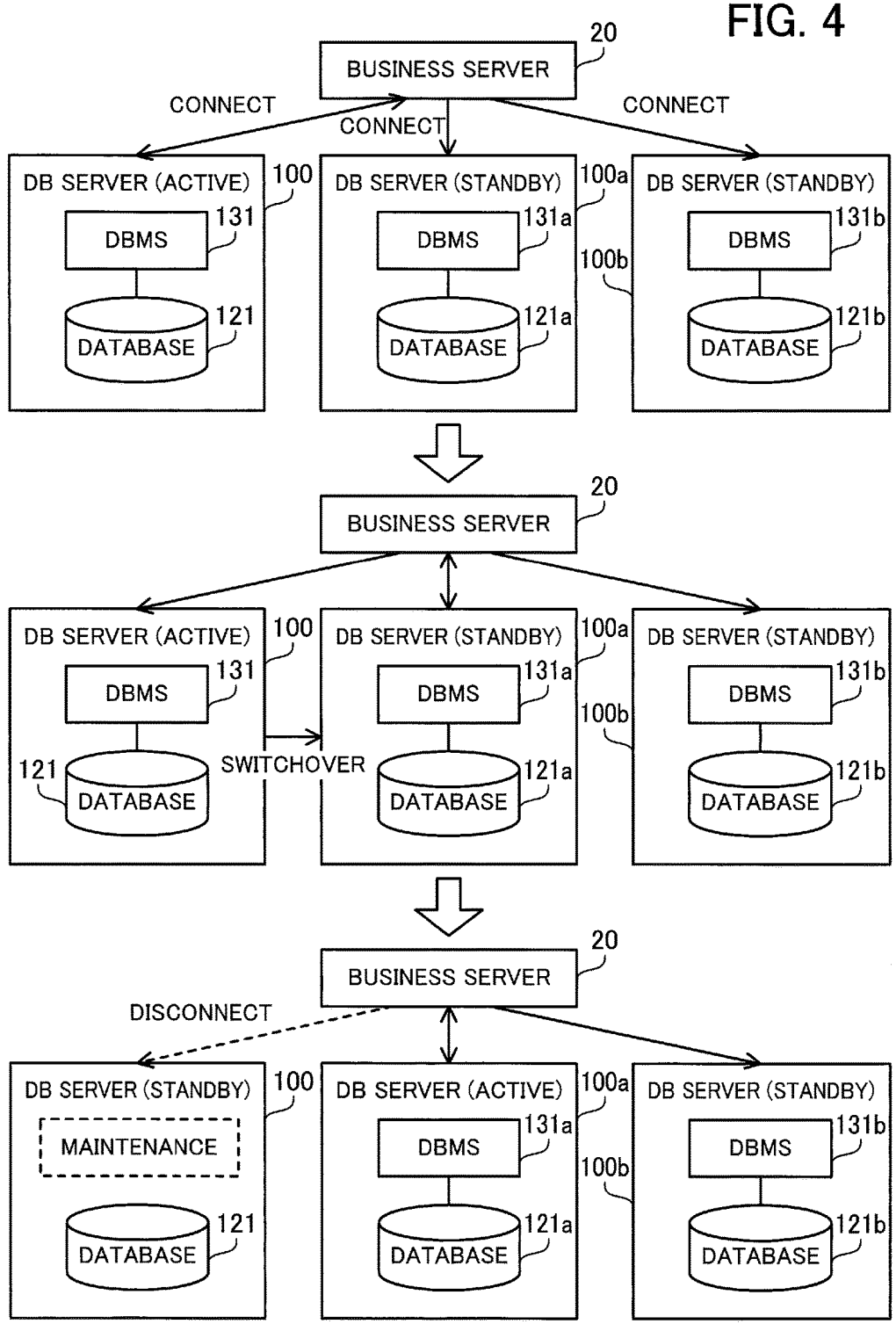
FIG. 4 illustrates an exemplary maintenance work using switchover.

FIG. 4 illustrates an exemplary maintenance work using switchover.

The DB server 100 has a database 121 and a DBMS 131. The database 121 is stored in the HDD 103 or the RAM 102. The DBMS 131 is implemented, for example, as middleware executed by the CPU 101. Similarly, the DB server 100a has a database 121a and a DBMS 131a, and the DB server 100b has a database 121b and a DBMS 131b. Here, it is assumed that the DB server 100 is operating in the active state, and the DB servers 100a and 100b are operating in the standby state.

The business server 20 establishes connections with each of the DB servers 100, 100a, and 100b. When accessing a data set managed by the DB servers 100, 100a and 100b, the business server 20 transmits, to the DB servers 100, 100a and 100b, a message indicating a processing request such as a search request or an update request. The DB servers 100a and 100b in the standby state discard the messages received from the business server 20. On the other hand, the DB server 100 in the active state performs a process such as retrieving data from the database 121 or updating the database 121, according to the received message, and notifies the business server 20 of the processing result.

Here, when maintenance work is performed on the DB server 100, the terminal apparatus 31 transmits a switching instruction to the DB server 100. Accordingly, switchover is performed between the active DB server 100 and one of the standby DB servers (here, the DB server 100a). Processing requests may be transmitted from the business server 20 to the DB servers 100, 100a and 100b also during the switchover. The switching source DB server 100 starts discarding the message received from the business server 20. The standby DB server 100b not involved in the switchover keeps discarding the message received from the business server 20. On the other hand, the switching destination DB server 100a starts performing a process according to the received message and notifying the business server 20 of the processing result. As will be described below, the transaction being executed in the switching source DB server 100 is handed over to the switching destination DB server 100a.

Upon completion of switchover from the DB server 100 to the DB server 100a, the switching source DB server 100 disconnects the connection with the business server 20, and stops the DBMS 131. Accordingly, the DB server 100 transitions to the stopped state, allowing the maintenance work to be performed. The switching destination DB server 100a transitions to the active state. Upon completion of the maintenance work of the DB server 100, it is possible to activate the DBMS 131 and incorporate the DB server 100 in the database system again to be in the standby state. Maintenance works may be sequentially performed on the DB servers 100, 100a and 100b by switching active DB servers in sequence by switchover. Updating software and hardware of a plurality of computers in such a manner may be referred to as "rolling update".

Next, the relation between connection and transaction will be described.

Figure 5:
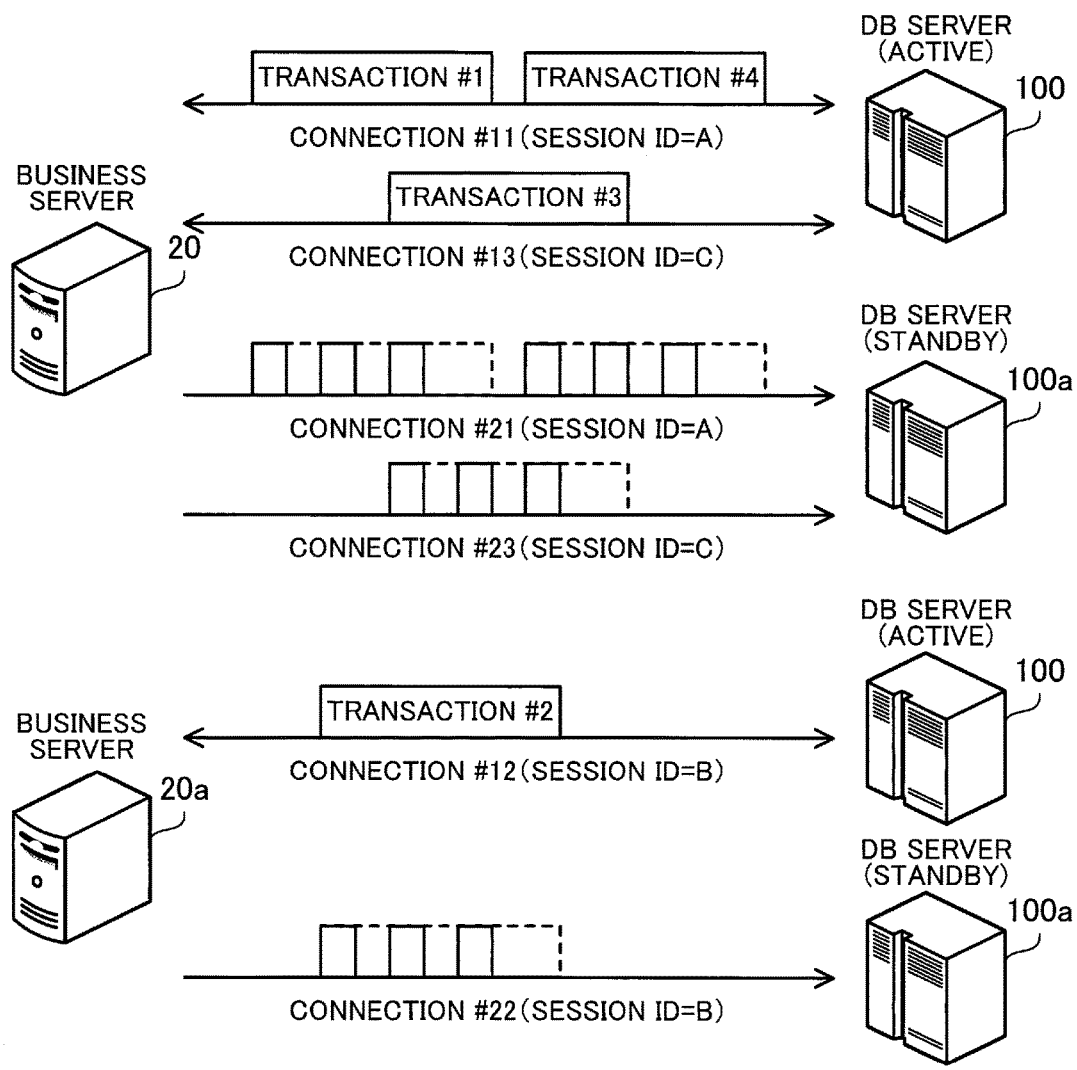
FIG. 5 illustrates an exemplary connection and transaction.

FIG. 5 illustrates an exemplary connection and transaction.

The business server 20 establishes one or more connections with each of the DB servers 100, 100a and 100b, according to the execution status of the application software on the business server 20. The business server 20 may establish a plurality of connections with the same DB server, according to requests from different application software.

For example, the business server 20 establishes connections #11 and #13 with the DB server 100, and establishes connections #21 and #23 with the DB server 100a. A session ID=A is provided to the connection #11 and a session ID=C is provided to the connection #13 as identification information of each connection. In contrast, the same session ID=A as the connection #11 is provided to the connection #21, and the same session ID=C as the connection #13 is provided to the connection #23.

The same session ID is provided to two different connections of the DB server because the business server or application software of requestors are the same and the DB servers 100 and 100a determine the session ID according to the same DBMS program. Similarly, for example, the business server 20a establishes the connection #12 with the DB server 100 and establishes the connection #22 with the DB server 100a. A session ID=B is provided to the connection #12 and the same session ID=B as the connection #12 is provided to the connection #22, as identification information of each connection.

The business servers 20 and 20a, and the DB servers 100, 100a and 100b may treat a series of updating processes according to a plurality of processing requests transmitted at different timings as one transaction. The business servers 20 and 20a, and the DB servers 100, 100a and 100b may generate only one transaction at the same time per one session ID. When a certain transaction is terminated by commit or rollback, it is possible to generate a next transaction on the same connection.

For example, the business server 20 transmits an update request over the connection #11 and transmits an update request having the same contents over the connection #21. The DB server 100 receives the update request over the connection #11 and generates a transaction #1 with a transaction ID provided thereto. On the other hand, the DB server 100a discards the update request received over the connection #21. Thereafter, the business server 20 transmits a processing request belonging to the transaction #1 over the connection #11 and transmits a processing request having the same contents over the connection #21. The business server 20 transmits a commit request when reflecting the details of the updating to the database, or transmits a rollback request when cancelling the updating. Accordingly, the transaction #1 is terminated.

After the transaction #1 has been terminated, the business server 20 may transmit a processing request belonging to a transaction #4 over the connection #11. On this occasion, the business server 20 transmits a processing request having the same contents over the connection #21. In addition, the business server 20, for example, transmits a processing request belonging to a transaction #3 over the connection #13 in parallel with the transaction #1. On this occasion, the business server 20 transmits a processing request having the same contents over the connection #23. In addition, the business server 20a transmits a processing request belonging to a transaction #2 over the connection #12 in parallel with the transaction #1. On this occasion, the business server 20a transmits a processing request having the same contents over the connection #22.

Next, transaction control by the DB servers 100, 100a and 100b and handover of a transaction during switchover will be described.

Figure 6:
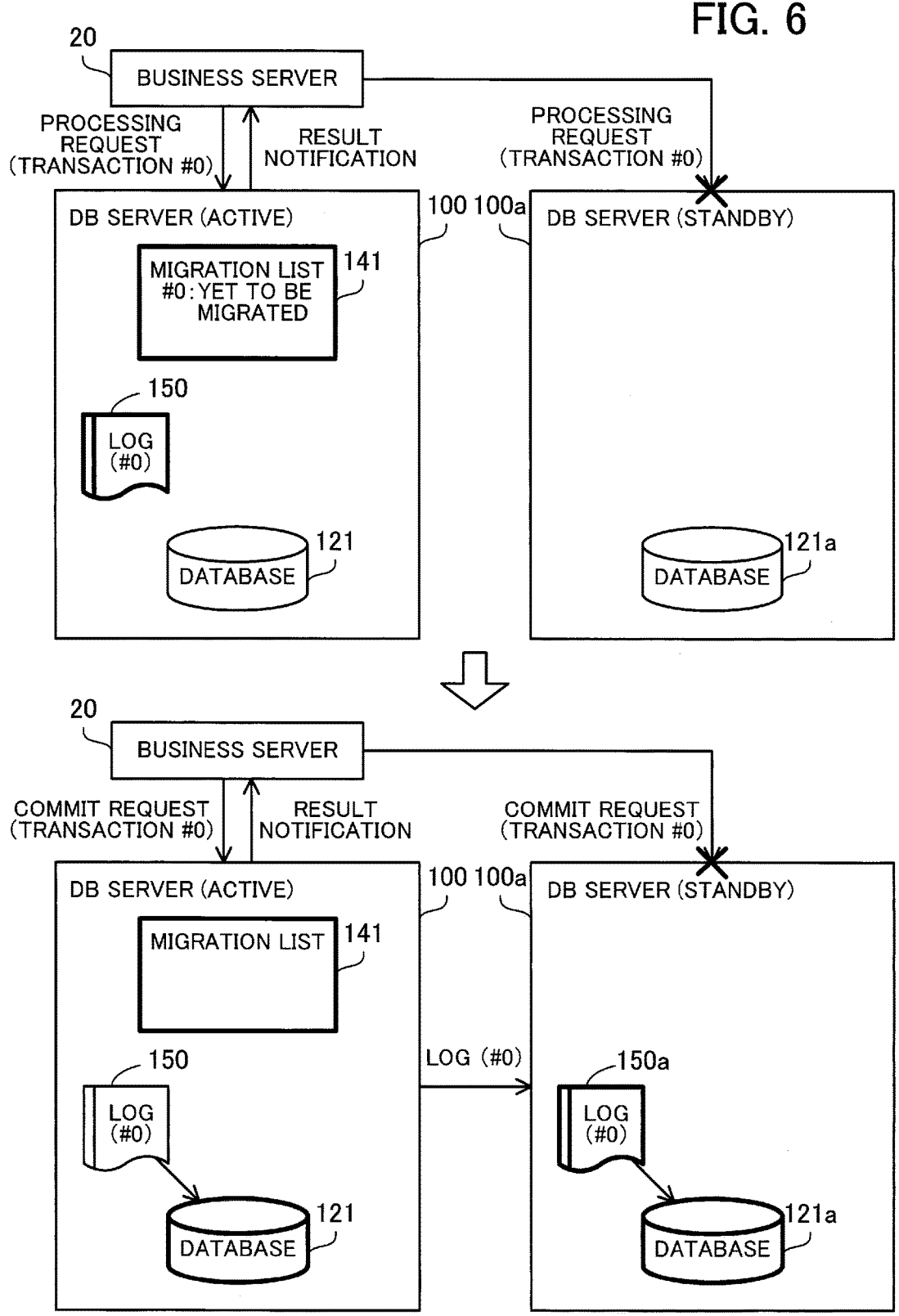
FIG. 6 is a first diagram illustrating an exemplary transaction processing.

FIG. 6 is a first drawing illustrating an exemplary transaction processing.

When the business server 20 transmits a processing request which may generate a transaction #0 to the DB servers 100, 100a and 100b, the active DB server 100 performs a process preceding the updating of the database 121 such as acquisition of data to be updated. The DB server 100 then generates and holds a transaction log 150 indicating the state of the transaction #0 such as the details of the updating. In addition, the DB server 100 registers the transaction #0 in a migration list 141 held by the DB server 100 and sets the migration state to "yet-to-be-migrated". On the other hand, the DB servers 100a and 100b in the standby state discard the processing request received from the business server 20. Description of the operation of the DB server 100b is omitted in FIGS. 6 to 9.

Subsequently, when the business server 20 transmits a commit request of the transaction #0 to the DB servers 100, 100a and 100b, the DB server 100 reflects, in the database 121, the details of the updating indicated in the transaction log 150. In addition, the DB server 100 transmits, to the DB servers 100a and 100b in the standby state, a transaction log 150a which is a copy of the transaction log 150. The DB server 100a discards the commit request received from the business server 20 and reflects, in the database 121a, the details of the updating indicated in the transaction log 150a received from the DB server 100. The DB server 100b also performs a process similar to that performed by the DB server 100a. The DB server 100 then deletes the transaction log 150 and erases information of the transaction #0 from the migration list 141.

Figure 7:
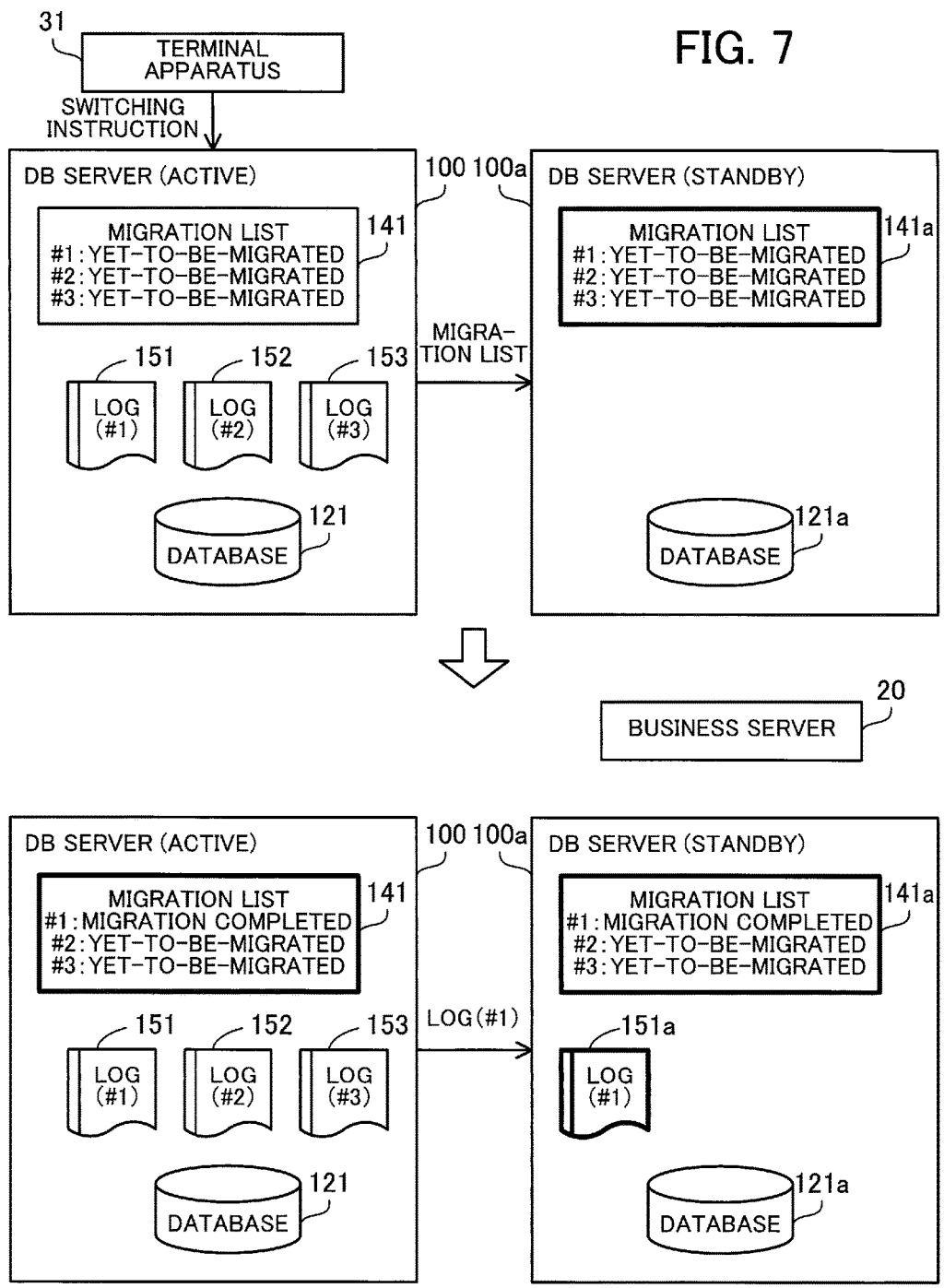
FIG. 7 is a second diagram illustrating an exemplary transaction processing.

FIG. 7 is a second drawing illustrating an exemplary transaction processing.

Here, it is assumed that the transactions #1, #2 and #3 described in FIG. 5 are being executed in the DB server 100. The DB server 100 has a transaction log 151 corresponding to the transaction #1, a transaction log 152 corresponding to the transaction #2, and a transaction log 153 corresponding to the transaction #3. In addition, the migration list 141 held by the DB server 100 has the transactions #1, #2 and #3 registered therein, with the migration state of each transaction being set to "yet-to-be-migrated".

On this occasion, it is assumed that the terminal apparatus 31 has transmitted a switching instruction to the DB server 100. Accordingly, switchover is performed from the DB server 100 to the DB server 100a. The switching source DB server 100 transmits a migration list 141a, which is a copy of the migration list 141, to the DB server 100a. Subsequently, the DB server 100 transmits the transaction logs 151, 152 and 153 to the DB server 100a one by one, according to the migration list 141. The transmission order is assumed to be, for example, the order of registering transactions in the migration list 141 (the order of earlier generation timing). However, the logs may be transmitted in any order.

For example, the DB server 100 first selects the transaction #1 registered at the top of the migration list 141. The DB server 100 then transmits a transaction log 151a, which is a copy of the transaction log 151 corresponding to the transaction #1, to the DB server 100a. The DB server 100 updates the migration state of the transaction #1 described in the migration list 141 to "migration completed", and the DB server 100a updates the migration state of the transaction #1 described in the migration list 141a to "migration completed".

Figure 8:
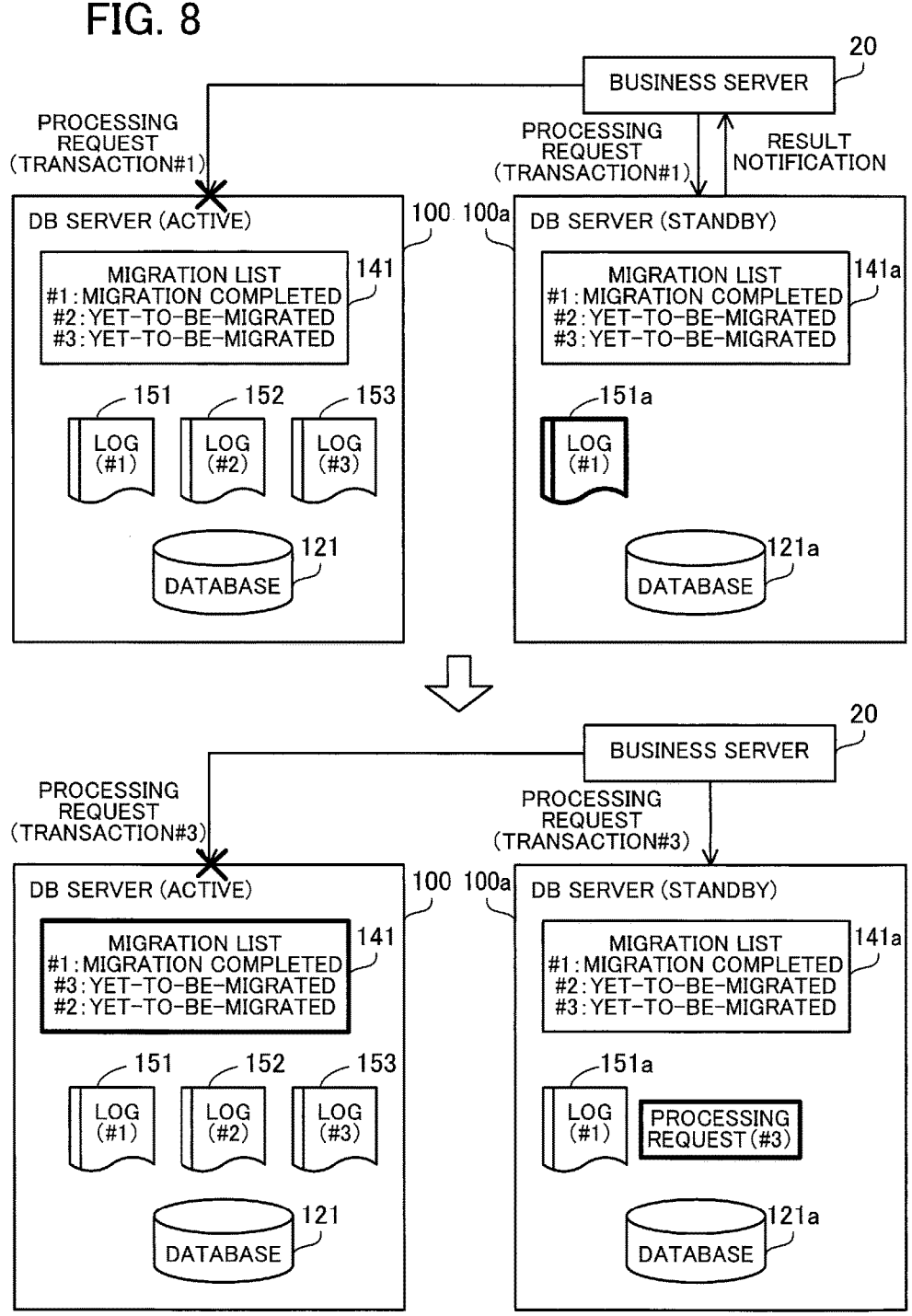
FIG. 8 is a third diagram illustrating an exemplary transaction processing.

FIG. 8 is a third drawing illustrating an exemplary transaction processing.

Even during switchover, there is a possibility that the DB servers 100, 100a and 100b receive processing requests from the business servers 20 and 20a. It is assumed that after the transaction #1 had been handed over to the DB server 100a from the DB server 100, as described above, the business server 20 has transmitted, to the DB servers 100, 100a and 100b, a processing request belonging to the transaction #1. The switching source DB server 100 discards the processing request. The switching destination DB server 100a detects that the migration state of the transaction #1 is "migration completed", referring to the migration list 141a. The DB server 100a then advances the processing of the transaction #1, using the transaction log 151a received from the DB server 100. The DB server 100b discards the processing request received from the business server 20.

Next, it is assumed that the business server 20 has transmitted, to the DB servers 100, 100a and 100b, a processing request belonging to the transaction #3. The DB server 100 discards the processing request. In addition, the DB server 100 detects that the migration state of the transaction #3 is "yet-to-be-migrated", referring to the migration list 141. The DB server 100 then updates the migration list 141 so as to increase the migration priority of the transaction log 153 corresponding to the transaction #3. The DB server 100a detects that the migration state of the transaction #3 is "yet-to-be-migrated", referring to the migration list 141a. The DB server 100a then stores a processing request in the buffer, and waits until the migration state becomes "migration completed". The DB server 100b discards the processing request received from the business server 20.

Figure 9:
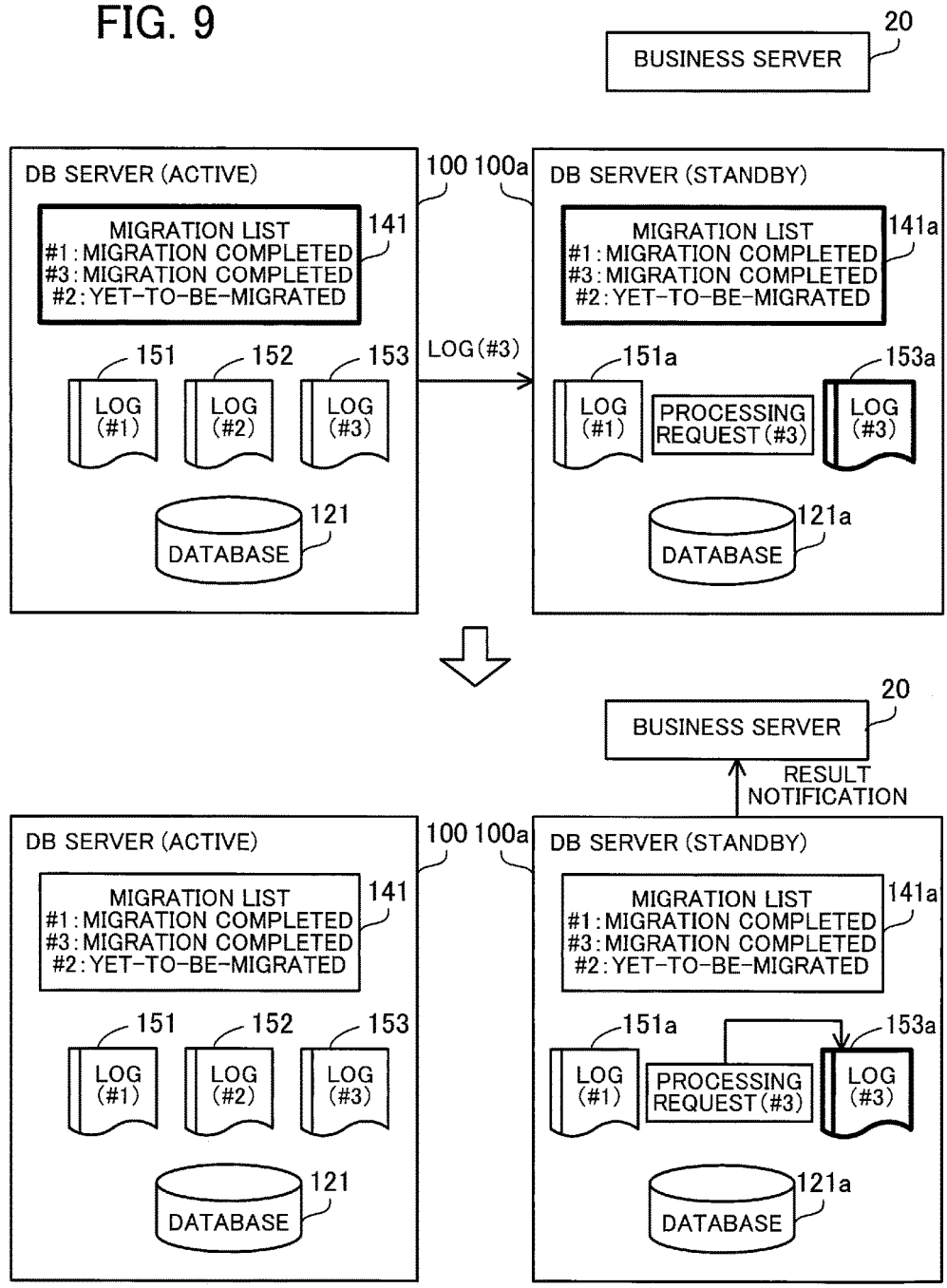
FIG. 9 is a fourth diagram illustrating an exemplary transaction processing.

FIG. 9 is a fourth drawing illustrating an exemplary transaction processing.

The migration priority of the transaction #3 is increased, and thus the DB server 100 skips the transaction #2 and selects the transaction #3. The transaction #3 is the topmost "yet-to-be-migrated" transaction registered in the migration list 141, for example. The DB server 100 then transmits a transaction log 153a, which is a copy of the transaction log 153 corresponding to the transaction #3, to the DB server 100a. The DB server 100 updates the migration state of the transaction #3 described in the migration list 141 to "migration completed", and the DB server 100a updates the migration state of the transaction #3 described in the migration list 141a to "migration completed".

Upon detecting that the migration state of the transaction #3 has transitioned to "migration completed", the DB server 100a takes out a processing request of the transaction #3 from the buffer. The DB server 100a performs a process according to the processing request, using the transaction log 153a corresponding to the transaction #3, and notifies the business server 20 of the processing result. As thus described, when switchover is started, the message from the business server 20 is processed by the switching destination DB server 100a and the processing result is notified from the DB server 100a to the business server 20. On this occasion, the switching source DB server 100 increases the migration priority of the transaction when the message belongs to a yet-to-be-migrated transaction, and the DB server 100a processes the message after the transaction has been migrated.

Next, a function of the DB server 100 and a process performed by the DB server 100 will be described. The DB servers 100a and 100b also have a similar function and perform a similar process.

Figure 10:
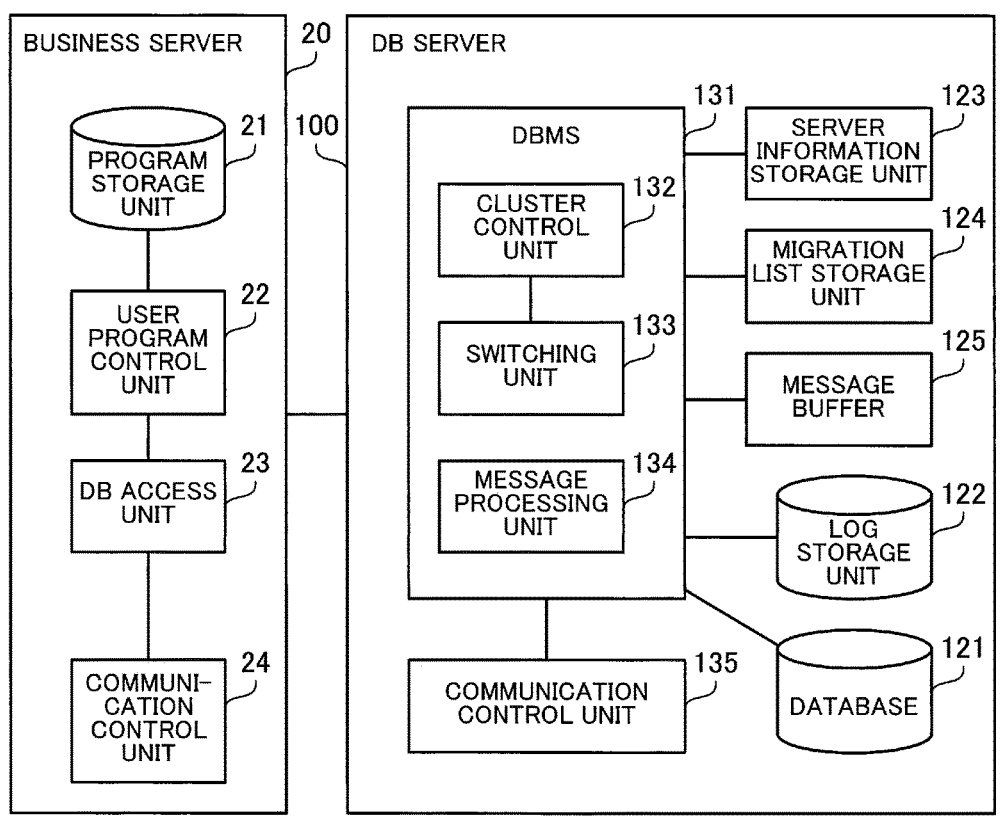
FIG. 10 is a block diagram illustrating exemplary functions of a business server and a DB server.

FIG. 10 is a block diagram illustrating exemplary functions of the business server and the DB server.

The business server 20 has a program storage unit 21, a user program control unit 22, a DB access unit 23, and a communication control unit 24. The program storage unit 21 is implemented as, for example, a storage area secured in a RAM or an HDD provided in the business server 20. The user program control unit 22, the DB access unit 23, and the communication control unit 24 are implemented as, for example, software modules executed by the business server 20.

The program storage unit 21 stores programs of the application software created by the user (user program). When a user program is activated, a "process" is generated, which is an execution instance of the user program. Some user programs may generate one or more "threads" which may be executed in parallel in one process. In addition, some user programs may request to generate a connection with the database, and output the processing request, by specifying the connection. Connections with a database may be generated for each thread.

A user program control unit 22 invokes a user program stored in the program storage unit 21, and controls execution of the user program in the business server 20.

The DB access unit 23 accesses the database, according to a process activated by the user program control unit 22 or a request from a thread. When establishment of a connection has been requested, the DB access unit 23 generates three connection requests and outputs them as messages addressed to the DB servers 100, 100a and 100b. When generating a request for establishing connections to a plurality of servers, the DB access unit 23 may generate one connection request and output it as a message addressed to the DB servers 100, 100a and 100b, using a network device supporting multicast. When searching or updating a database is requested, the DB access unit 23 generates three processing requests and outputs them as messages addressed to the DB servers 100, 100a and 100b. When committing or rolling back a transaction is requested, the DB access unit 23 generates three commit requests or rollback requests and outputs them as messages addressed to the DB servers 100, 100a and 100b. In addition, upon receiving a result notification from any of the DB servers, the DB access unit 23 hands over the result notification to a process or thread specified by the result notification.

The communication control unit 24 controls communication via the network 30. The communication control unit 24 receives a message from the DB access unit 23 and transmits the message to a DB server specified by the DB access unit 23. In addition, the communication control unit 24 receives a result notification from any of the DB servers and hands over the received result notification to the DB access unit 23.

The DB server 100 has the database 121, a log storage unit 122, a server information storage unit 123, a migration list storage unit 124, a message buffer 125, the DBMS 131, and a communication control unit 135. The log storage unit 122, the server information storage unit 123, the migration list storage unit 124, and the message buffer 125 are implemented as storage areas secured in the RAM 102 or the HDD 103, for example. The communication control unit 135 is implemented as a software module executed by the DB server 100, for example.

The database 121 stores data, as described above. When the database 121 is a relational database (RDB), the database 121 stores one or more tables. The database 121 may store definition information of a data structure.

The log storage unit 122 stores transaction logs such as the transaction log 150 illustrated in FIG. 6 or the transaction logs 151 to 153 illustrated in FIG. 7. One transaction log corresponds to one transaction and indicates the state of the transaction. Each transaction log includes a session ID indicating a connection which has received a processing request, or update data indicating the details of the updating which are yet to be reflected in the database.

The server information storage unit 123 stores a configuration file which is referred to when the DB server 100 is activated. The configuration file is created by the user. The configuration file has described therein information used when an active DB server is determined.

The migration list storage unit 124 stores the migration list 141 illustrated in FIG. 6. As described above, the migration list 141 indicates the transaction being executed in the DB server 100. The migration list 141 is updated according to occurrence or termination of a transaction, and referred to when a transaction is migrated to another DB server during switchover.

The message buffer 125 temporarily stores messages which are not able to be immediately processed, among the messages received from the business servers 20 and 20a. For example, the message buffer 125 stores a processing request belonging to the transaction #3 illustrated in FIG. 8.

The DBMS 131 receives messages from the business servers 20 and 20a, and controls access to the database 121. In addition, the DBMS 131 controls synchronization between the database 121 and databases of other DB servers. The DBMS 131 has a cluster control unit 132, a switching unit 133, and a message processing unit 134.

The cluster control unit 132 performs an activation process of the DBMS 131, referring to a configuration file stored in the server information storage unit 123. In addition, the cluster control unit 132 monitors the operation status of other DB servers, and determines the state (active, standby, or stopped) of the DB server 100, according to the operation status of other DB servers. In addition, the cluster control unit 132 receives a command from the terminal apparatus 31 and determines the state of the DB server 100, according to the command. However, the switching instruction, which is a command indicating switchover, may be transferred via one of the other DB servers which has received the switching instruction from the terminal apparatus 31. Upon receiving a switching instruction, the cluster control unit 132 outputs the switching instruction to the switching unit 133.

Upon acquiring a switching instruction from the cluster control unit 132, the switching unit 133 controls handover of a transaction. When the DB server 100 is in the active state, the DB server 100 may become a switching source which hands over the transaction. When the DB server 100 is in the standby state, the DB server 100 may become a switching destination which receives the transaction. When the DB server 100 is the switching source, the switching unit 133 refers to the migration list 141 stored in the migration list storage unit 124, and transmits transaction logs stored in the log storage unit 122 sequentially to the switching destination DB server. When the DB server 100 is the switching destination, the switching unit 133 acquires the migration list 141 from the switching source, stores it in the migration list storage unit 124, acquires transaction logs sequentially from the switching source by referring to the migration list 141, and stores them in the log storage unit 122.

The message processing unit 134 acquires, from the business servers 20 and 20a, messages such as search requests, update requests, commit requests, rollback requests, or the like. When the DB server 100 is in the standby state, the message processing unit 134 discards the acquired message, without performing the requested process. When the DB server 100 is in the active state, the message processing unit 134 performs a process according to the acquired message, and notifies the processing result to the transmission source of the message.

Here, when a new transaction occurs due to an update request, the message processing unit 134 generates a transaction log corresponding to the transaction and stores it in the log storage unit 122. For an update request belonging to the transaction, the message processing unit 134 keeps track of the details of the updating in the transaction log without reflecting them in the database 121. Subsequently, when a commit request is acquired, the message processing unit 134 updates the database 121 based on the transaction log stored in the log storage unit 122. When a rollback request is acquired, the message processing unit 134 cancels the updating process of the transaction by discarding the transaction log stored in the log storage unit 122.

When, however, the DB server 100 is the switching destination of the switchover, the message processing unit 134 processes, in place of the switching source DB server, messages acquired from the business servers 20 and 20a. Upon acquiring a message about an already migrated transaction, the message processing unit 134 processes the message, using the transaction log corresponding to the transaction stored in the log storage unit 122. Upon acquiring a message about a yet-to-be-migrated transaction, the message processing unit 134 temporarily stores the message in the message buffer 125 and waits until the transaction is migrated.

The communication control unit 135 controls communication via the network 30. The communication control unit 135 receives messages from the business servers 20 and 20a and hands over the received messages to the message processing unit 134. In addition, the communication control unit 135 receives the processing result from the message processing unit 134, and transmits it to the business servers 20 and 20a as a response to the message. In addition, the communication control unit 135 receives a command from the terminal apparatus 31, and hands over the received command to the cluster control unit 132. In addition, the communication control unit 135 transmits or receives transaction logs, the migration list 141, commands or the like to or from the DB servers 100a and 100b.

FIG. 11 illustrates an exemplary configuration file.

A configuration file 142 is stored in the server information storage unit 123 described above. The configuration file 142 has pairs of parameters and values described therein. The parameters described in the configuration file 142 include ClusterServers and StartupTimer.

The parameter ClusterServers indicates a plurality of DB servers participating in a cluster system. Server IDs for identifying DB servers may be enumerated as values of the parameter ClusterServers. The server IDs are enumerated in the descending order of the priority of servers. The server with the highest priority among the DB servers normally operating (surviving) operates in the active state.

The parameter StartupTimer indicates the maximum waiting time for a response to a survival confirmation message. The number of seconds, which is a threshold value of the waiting time, is provided as a value of the parameter StartupTimer. When the DBMS 131 is activated, the DB server 100 transmits a survival confirmation message to other DB servers to determine the state of the DB server 100. The DB server 100 determines a DB server as surviving which has responded before StartupTimer seconds have passed since the transmission of the survival confirmation message. On the other hand, the DB server 100 determines a DB server as not surviving which has not responded after StartupTimer seconds have passed since the transmission of the survival confirmation message.

FIG. 12 illustrates an exemplary list of surviving servers.

A surviving server list 143 is generated and stored in the server information storage unit 123 described above, when the DBMS 131 is activated. The survival server list 143 includes columns for server ID, IP (Internet Protocol) address, port number, and priority.

The server ID column has registered therein server IDs for identifying DB servers determined to be surviving (including the DB server 100 itself). Server IDs are preliminarily assigned to respective DB servers. For example, the server ID of the DB server 100 is SV1, the server ID of the DB server 100a is SV2, and the server ID of the DB server 100b is SV3. The IP address column has registered therein IP addresses used by DB servers determined to be surviving. The port number column has registered therein port numbers used by DB servers determined to be surviving for message communication between DB servers. The priority column has registered therein priorities of DB servers determined to be surviving. A priority may be determined from the configuration file 142. In the example of FIG. 12, "1" indicates the highest priority, with "2" and "3" indicating lower priorities.

FIG. 13 illustrates an exemplary message.

A message 144 may be transmitted from the business server 20 to the DB servers 100, 100a and 100b. The message 144 includes fields for client ID, client IP address, client port number, client process ID, client thread ID, session ID, request time, request type, target resource, and input data.

The client ID field has registered therein identification information of the transmission source business server. A client ID is preliminarily assigned to each business server. The client IP address field has registered therein an IP address used by a transmission source business server. The client port number field has registered therein a transmission source port number used for transmitting the message 144. The client process ID field has registered therein a process ID for identifying a process instructing transmission of the message 144. The client thread ID field has registered therein a thread ID for identifying a thread instructing transmission of the message 144. The session ID field has registered therein identification information of a connection used for transmission of the message 144.

A session ID is generated according to a predetermined algorithm when a connection is established, based on a client ID, a client IP address, a client port number, a client process ID, and a client thread ID. Accordingly, when one and the same thread establishes connections with the DB servers 100, 100a and 100b, respectively, the session IDs provided to the three connections are the same.

The request time field has registered therein the generation time of the message 144 as the time stamp provided by the transmission source business server. The request type field has registered therein the type of processing. For example, "SELECT" indicating data retrieval, "INSERT" indicating data insertion, "UPDATE" indicating data rewriting, "DELETE" indicating data erasion, or the like, may be enumerated as the request type. The target resource field has registered therein names indicating a region of the data to be processed, such as database name, schema name, table name or partition name. The input data field has registered therein information for identifying the data to be processed such as search condition or cursor name.

A message as a result notification which is sent back from the DB server 100 to the business server 20 may also include similar fields as those of the message 144. However, a result notification message includes an output data field in place of the input data field. The output data field has registered therein a result of a process performed according to the message 144. In the case of a response to a search request, the retrieved data is included in the output data. In the case of a response to an update request, the output data includes information indicating whether or not the update has succeeded or information indicating the row of a record which has been rewritten or inserted.

FIG. 14 illustrates an exemplary transaction log.

The transaction log 151 is generated and stored in the log storage unit 122 when a transaction occurs. The transaction log 151 includes fields for transaction ID, client ID, client IP address, client port number, session ID, start time, transaction state, transaction type, target resource, exclusive competitor, cursor state, cursor position, and update data.

The transaction ID field has registered therein identification information provided when a new transaction occurs. A new transaction may occur when, for example, the DB server 100 processes an update request that does not belong to any transaction. The fields for client ID, client IP address, client port number, and session ID have registered therein entries described in the message which has triggered the occurrence of the transaction.

The start time field has registered therein the occurrence time of a transaction as a time stamp provided by the DB server 100. The transaction state field is set to "CONTINUE" when a transaction is waiting for the next processing request. The transaction type field is set to ReadOnly or ReadWrite. The transaction type may be specified by the business servers 20 and 20*a* when a transaction is started. The target resource field has registered therein names indicating a data region such as database name, schema name, table name or partition name.

The exclusive competitor field has registered therein information for identifying another competing transaction, when a transaction attempts to access the same resource as that of another transaction and is waiting for the exclusive lock of the resource to be released. For example, information of an exclusive competitor includes a session ID and a client ID. The cursor state field is set to "OPEN" when the cursor is used for identifying the data to be processed. The cursor position field has registered therein the row number at which the cursor in the table is pointing.

The update data field has registered therein details of the updating which are yet to be reflected in the database 121. The update data includes, for example, table name, name of column to be updated, and data before and after updating. Upon receiving an update request, the DB server 100 performs the processes up to immediately preceding the updating of the database 121 such as acquiring the data to be updated, and keeps the update data registered in the transaction log 151 without updating the database 121. Subsequently, upon receiving a commit request, the DB server 100 updates the database 121 according to the update data.

FIG. 15 illustrates an exemplary migration list.

The migration list 141 is stored in the migration list storage unit 124. The migration list 141 includes columns for transaction ID, session ID, client ID, IP address, port number, and migration state. The transaction ID column has registered therein identification information generated when a transaction occurs. The columns for session ID, client ID, IP address, and port number have registered therein information similar to the transaction log. The migration state column has registered therein one of "0" (yet-to-be-migrated), "1" (migration-in-progress), and "2" (migration completed) as a value indicating whether or not the transaction has been migrated.

The initial value of the migration state of a newly occurred transaction is "0" (yet-to-be-migrated). When the DB server 100 is the switching source of switchover, transmitting the transaction log to the switching destination DB server turns the migration state of a transaction corresponding to the transaction log into "1" (migration-in-progress). Subsequently, when there is a response from the switching destination DB server, the migration state turns to "2" (migration completed). When the DB server 100 is the switching destination of switchover, receiving the transaction log from the switching source DB server turns the migration state of a transaction corresponding to the transaction log into "2" (migration completed).

Figure 16:
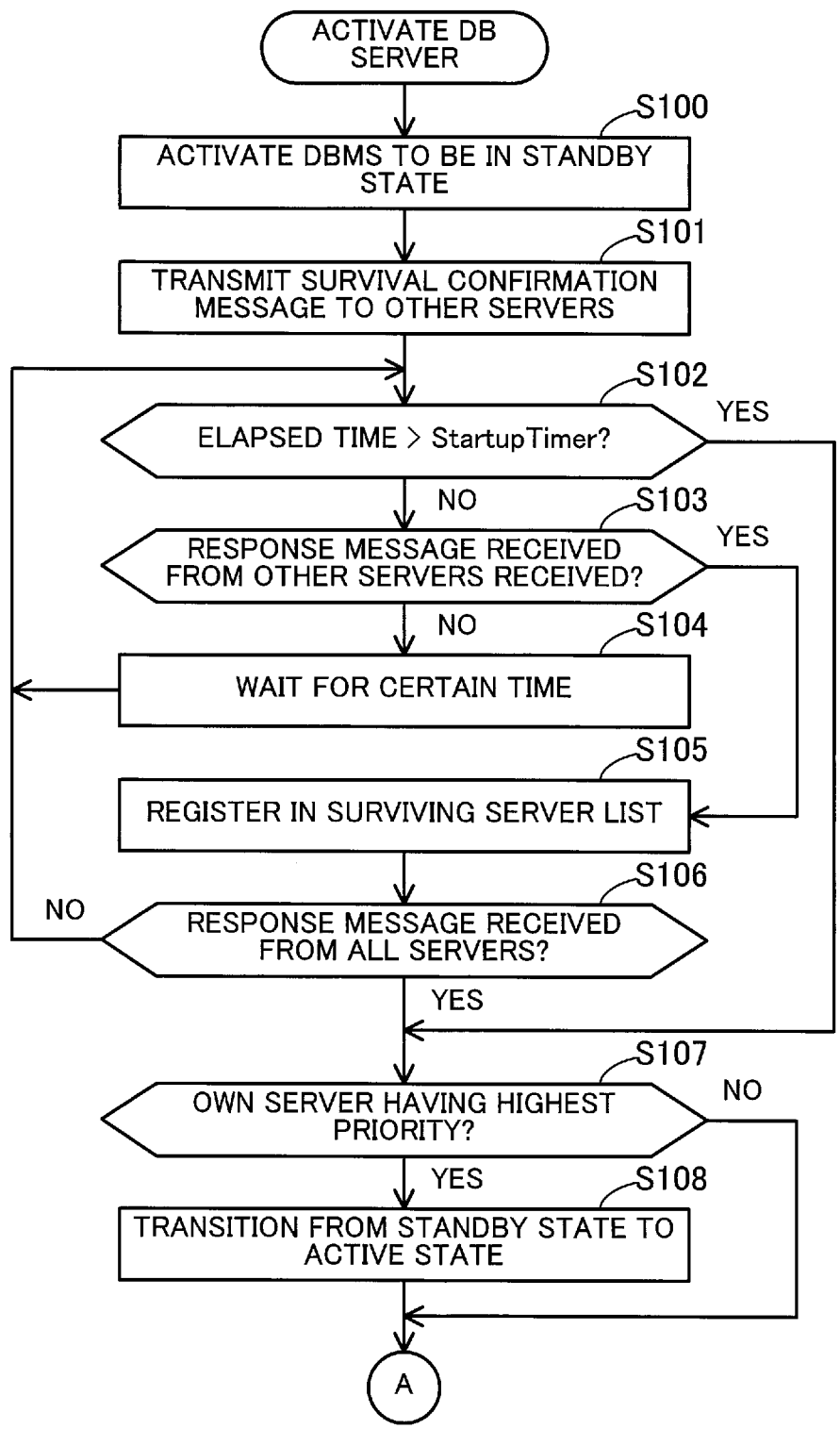
FIG. 16 is a flowchart illustrating an exemplary DB server activation procedure.

FIG. 16 is a flowchart illustrating an exemplary DB server activation procedure.

(S100) Upon activation of the DBMS 131, the cluster control unit 132 sets the initial state of the DB server 100 to the standby state. (S101) Referring to the parameter ClusterServers in the configuration file 142 stored in the server information storage unit 123, the cluster control unit 132 transmits a survival confirmation message to other DB servers participating in the cluster system. On this occasion, the cluster control unit 132 holds the transmission time of the survival confirmation message.

(S102) The cluster control unit 132 determines whether or not the elapsed time since the transmission of the survival confirmation message has exceeded a value (threshold value) of the parameter StartupTimer in the configuration file 142. The process flow proceeds to step S107 when the elapsed time has exceeded the threshold value, or proceeds to step S103 when the elapsed time has not yet exceeded the threshold value. (S103) The cluster control unit 132 checks whether or not a response message has been received from any of the DB servers to which the survival confirmation message has been transmitted. The process flow proceeds to step S105 when a response message has been received, or proceeds to step S104 when no response message has been received. (S104) The cluster control unit 132 waits for a certain time (e.g., 100 ms, or a value of a parameter added to the configuration file 142 may be used). Subsequently, the process flow proceeds to step S102.

(S105) The cluster control unit 132 registers, in the surviving server list 143, the DB server from which the response message has been transmitted. The DB server 100 itself is also registered in the surviving server list 143. (S106) The cluster control unit 132 determines whether or not a response message has been received from all the DB servers to which the survival confirmation message has been transmitted. The process flow proceeds to step S107 when the response message has been received from all the DB servers, or proceeds to step S102 when there exists a DB server from which no response message has been received.

(S107) The cluster control unit 132 determines whether or not the DB server 100 has the highest priority among the surviving DB servers (whose DBMSs are normally operating) registered in the surviving server list 143. The process flow proceeds to step S108 when the priority of the DB server 100 is the highest; otherwise the process flow proceeds to step S109. (S108) The cluster control unit 132 makes the state of the DB server 100 transition from the standby state to the active state.

Figure 17:
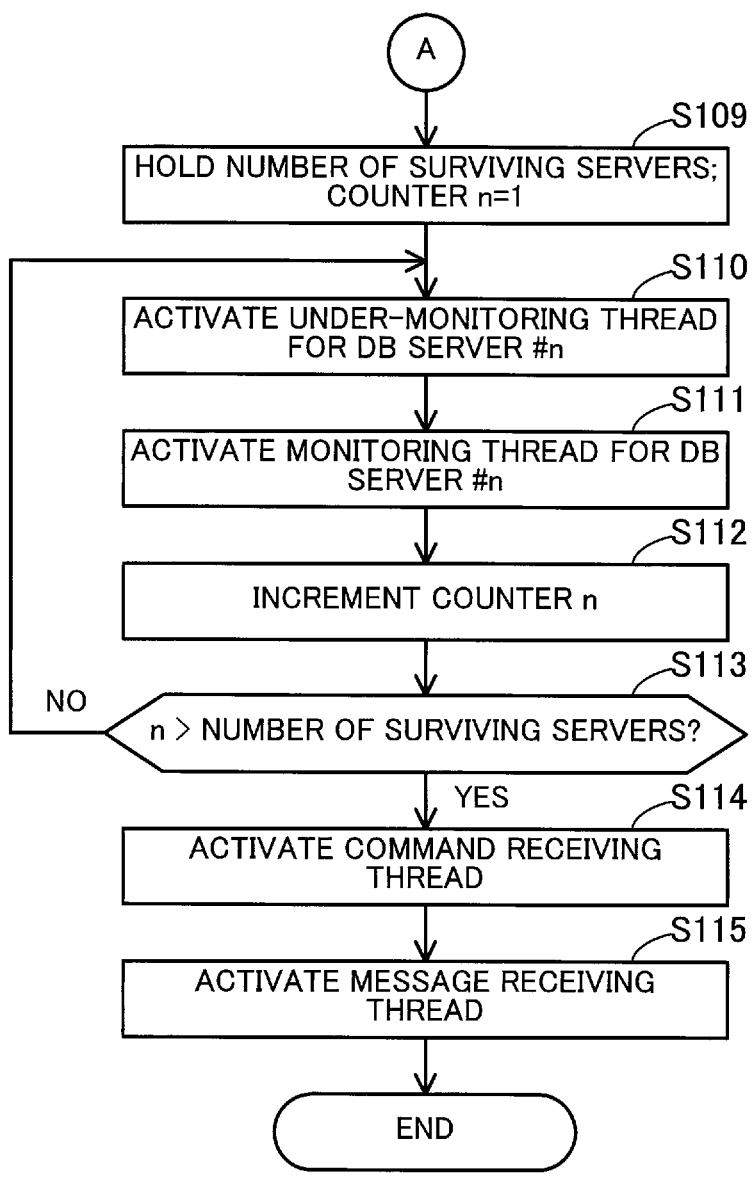
FIG. 17 is a flowchart illustrating an exemplary DB server activation procedure (continued)

FIG. 17 is a flowchart illustrating an exemplary DB server activation procedure (continued).

(S109) The cluster control unit 132 holds the number of surviving servers registered in the surviving server list 143. In addition, the cluster control unit 132 initializes the counter n to one. (S110) The cluster control unit 132 activates a under-monitoring thread for the n-th DB server registered in the surviving server list 143. Processing of the under-monitoring thread will be described below. (S111) The cluster control unit 132 activates a monitoring thread for the n-th DB server registered in the surviving server list 143. Processing of the monitoring thread will be described below.

(S112) The cluster control unit 132 increments (adds one to) the counter n. (S113) The cluster control unit 132 determines whether or not the value of the counter n is larger than the number of the surviving servers being held at step S109. When the condition is satisfied, all the DB servers registered in the surviving server list 143 have been selected and thus the process flow proceeds to step S114. When the condition is not satisfied, there exists a yet-to-be-selected surviving DB server and thus the process flow proceeds to step S110. (S114) The cluster control unit 132 activates a command receiving thread. Processing of the command receiving thread will be described below. (S115) The cluster control unit 132 activates a message receiving thread. Processing of the message receiving thread will be described below.

The under-monitoring thread, the monitoring thread, the command receiving thread, and the message receiving thread described above may be performed in parallel. The under-monitoring thread, the monitoring thread, the command receiving thread, and the message receiving thread may be activated in any order.

Figure 18:
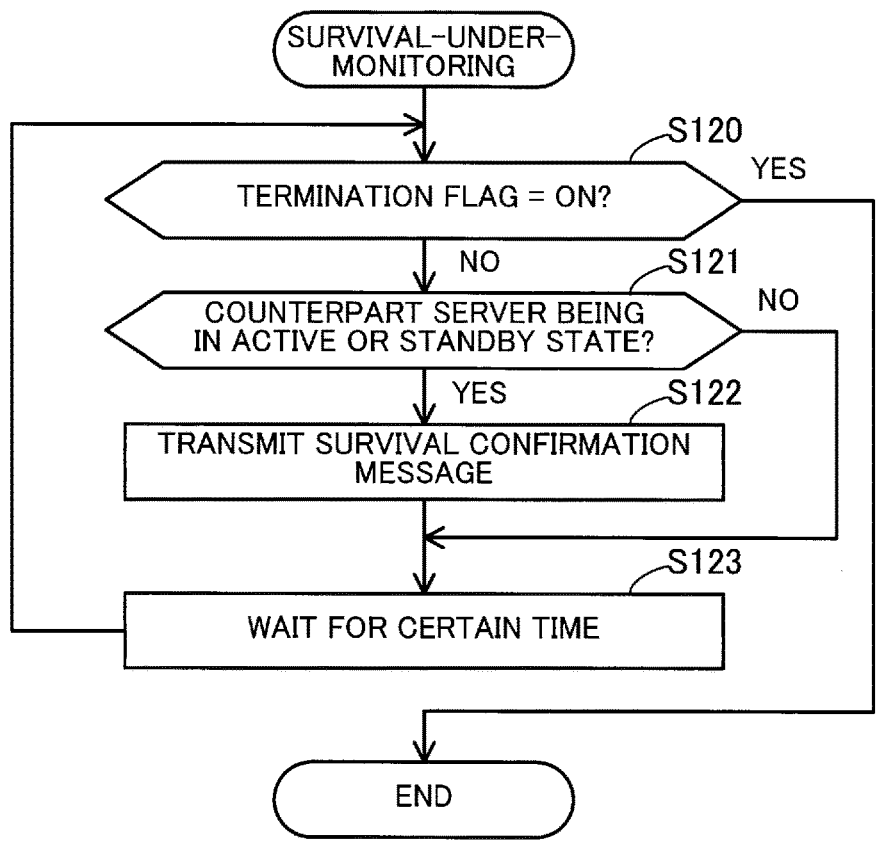
FIG. 18 is a flowchart illustrating an exemplary survival-under-monitoring procedure.

FIG. 18 is a flowchart illustrating an exemplary survival-under-monitoring procedure.

Processing of the survival-under-monitoring is performed in the aforementioned under-monitoring thread.

(S120) The cluster control unit 132 determines whether the termination flag of the DB server 100 is ON. The termination flag is a flag indicating whether or not the DBMS 131 is about to be terminated. The initial value of the termination flag is OFF when the DBMS 131 is activated, and the termination flag turns from OFF to ON at a timing described below. When the termination flag is ON, other DB servers need not determine the survival of the DB server 100 and therefore the survival-under-monitoring process is terminated. When the termination flag is OFF, the process flow proceeds to step S121.

(S121) The cluster control unit 132 determines whether the counterpart DB server specified at step S110 described above has settled to the active or standby state. The terminated state, for example, in which the DBMS has been terminated, may be mentioned as a state other than the active or standby state. The process flow proceeds to step S122 when the condition is satisfied, or proceeds to step S123 when the condition is not satisfied. (S122) The cluster control unit 132 transmits a survival confirmation message to the specified counterpart DB server. The survival confirmation message is generated, for example, based on the server ID described in the configuration file 142. (S123) The cluster control unit 132 waits for a certain time (e.g., 1000 ms, or a value of a parameter added to the configuration file 142 may be used). Subsequently, the process flow proceeds to step S120.

Figure 19:
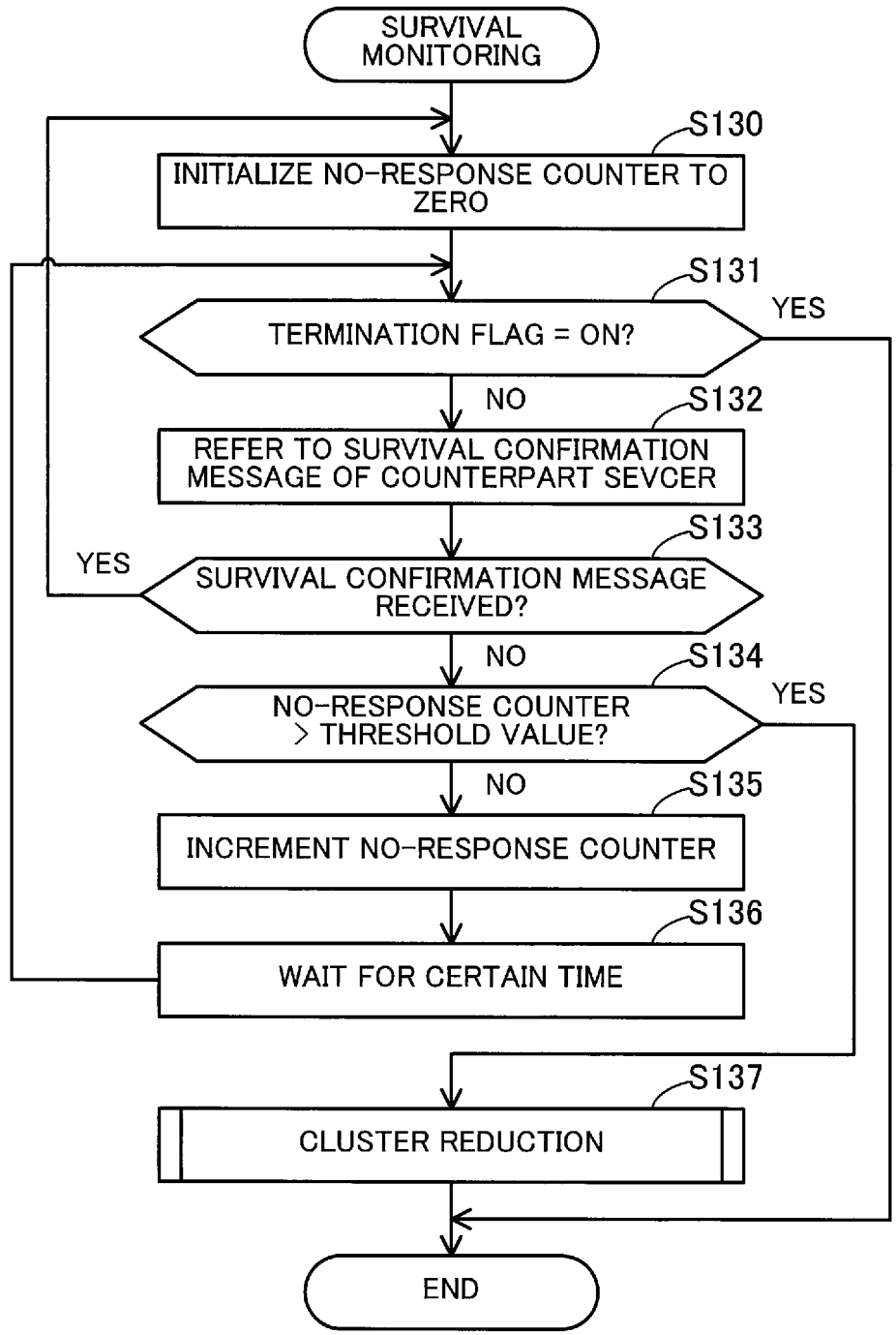
FIG. 19 is a flowchart illustrating an exemplary survival monitoring procedure.

FIG. 19 is a flowchart illustrating an exemplary survival monitoring procedure.

Processing of the survival monitoring is performed in the aforementioned monitoring thread.

(S130) The cluster control unit 132 initializes the no-response counter to zero. (S131) The cluster control unit 132 determines whether the termination flag of the DB server 100 is ON. When the termination flag is ON, the DB server 100 need not determine the survival of other DB servers and therefore the survival monitoring process is terminated. The process flow proceeds to step S132 when the termination flag is OFF. (S132) The cluster control unit 132 refers to the receiving status of the survival confirmation message from the DB server to be monitored which has been specified at step S111.

(S133) The cluster control unit 132 determines whether a survival confirmation message has been received from the DB server to be monitored. The process flow proceeds to step S130 when the survival confirmation message has been received, or proceeds to step S134 when no survival confirmation message has been received. (S134) The cluster control unit 132 determines whether the no-response counter has exceeded the threshold value, i.e., whether the number of times the survival confirmation message was not received in succession has exceeded a threshold value. The threshold value may be three times, for example. The process flow proceeds to step S137 when the condition is satisfied, or proceeds to step S135 when the condition is not satisfied.

(S135) The cluster control unit 132 increments (adds one to) the no-response counter. (S136) The cluster control unit 132 waits for a certain time (e.g., 1000 ms, or a value of a parameter added to the configuration file 142 may be used), for a timing at which a survival confirmation message is expected to be received next. Subsequently, the process flow proceeds to step S131. (S137) The cluster control unit 132 determines that the DBMS of the DB server to be monitored is not normally operating, and disconnects the DB server from the cluster system by a cluster fallback procedure described below.

Figure 20:
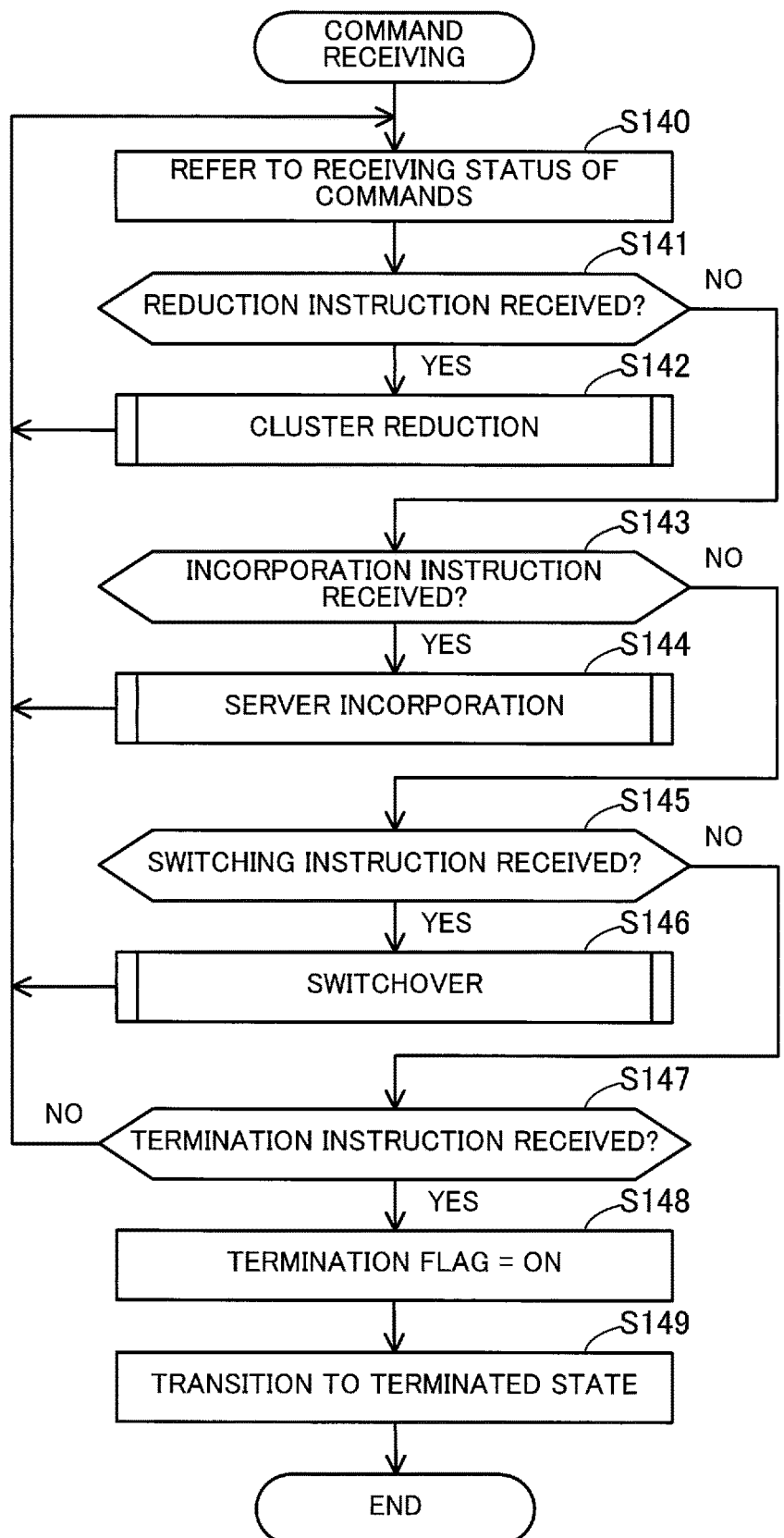
FIG. 20 is a flowchart illustrating an exemplary command receiving procedure.

FIG. 20 is a flowchart illustrating an exemplary command receiving procedure.

Processing of the command receiving is performed in the aforementioned command receiving thread.

(S140) The cluster control unit 132 refers to the receiving status of commands. Fallback instructions, incorporation instructions, switching instructions, termination instructions, or the like, may be enumerated as commands that may be received from the terminal apparatus 31. Switching instructions may be received from other DB servers.

(S141) The cluster control unit 132 determines whether a fallback instruction has been received. A fallback instruction is a command instructing to reduce the number of DB servers belonging to the cluster system, having specified the DB servers to be excluded. The process flow proceeds to step S142 when the fallback instruction has been received, or proceeds to step S143 when no fallback instruction has been received. (S142) The cluster control unit 132 disconnects the specified DB server from the cluster system by a cluster fallback procedure described below. Subsequently, the process flow proceeds to step S140.

(S143) The cluster control unit 132 determines whether an incorporation instruction has been received. An incorporation instruction is a command instructing to increase the number of DB servers belonging to the cluster system, specifying the DB server to be incorporated. The process flow proceeds to step S144 when the incorporation instruction has been received, or proceeds to step S145 when no incorporation instruction has been received. (S144) The cluster control unit 132 incorporates the specified DB server into the cluster system, by a server incorporation procedure described below. Subsequently, the process flow proceeds to step S140.

(S145) The cluster control unit 132 determines whether a switching instruction has been received. A switching instruction is a command instructing to perform a switchover to switch the active DB server. The switching instruction is transmitted from the terminal apparatus 31 to the switching source DB server, and transferred from the switching source DB server to the switching destination DB server. The process flow proceeds to step S146 when the switching instruction has been received, or proceeds to step S147 when no switching instruction has been received. (S146) The switching unit 133 performs a switchover procedure described below. Subsequently, the process flow proceeds to step S140.

(S147) The cluster control unit 132 determines whether a termination instruction has been received. A termination instruction is a command instructing to terminate the DBMS. The process flow proceeds to step S148 when the termination instruction has been received, or proceeds to step S140 when no termination instruction has been received. (S148) The cluster control unit 132 sets the termination flag to ON. (S149) The cluster control unit 132 stops the DBMS 131, and sets the DB server 100 to a terminated state.

The order of determining the fallback instruction, the incorporation instruction, the switching instruction and the termination instruction described above is exemplary, and may be determined in any order, or may be determined in parallel.

Figure 21:
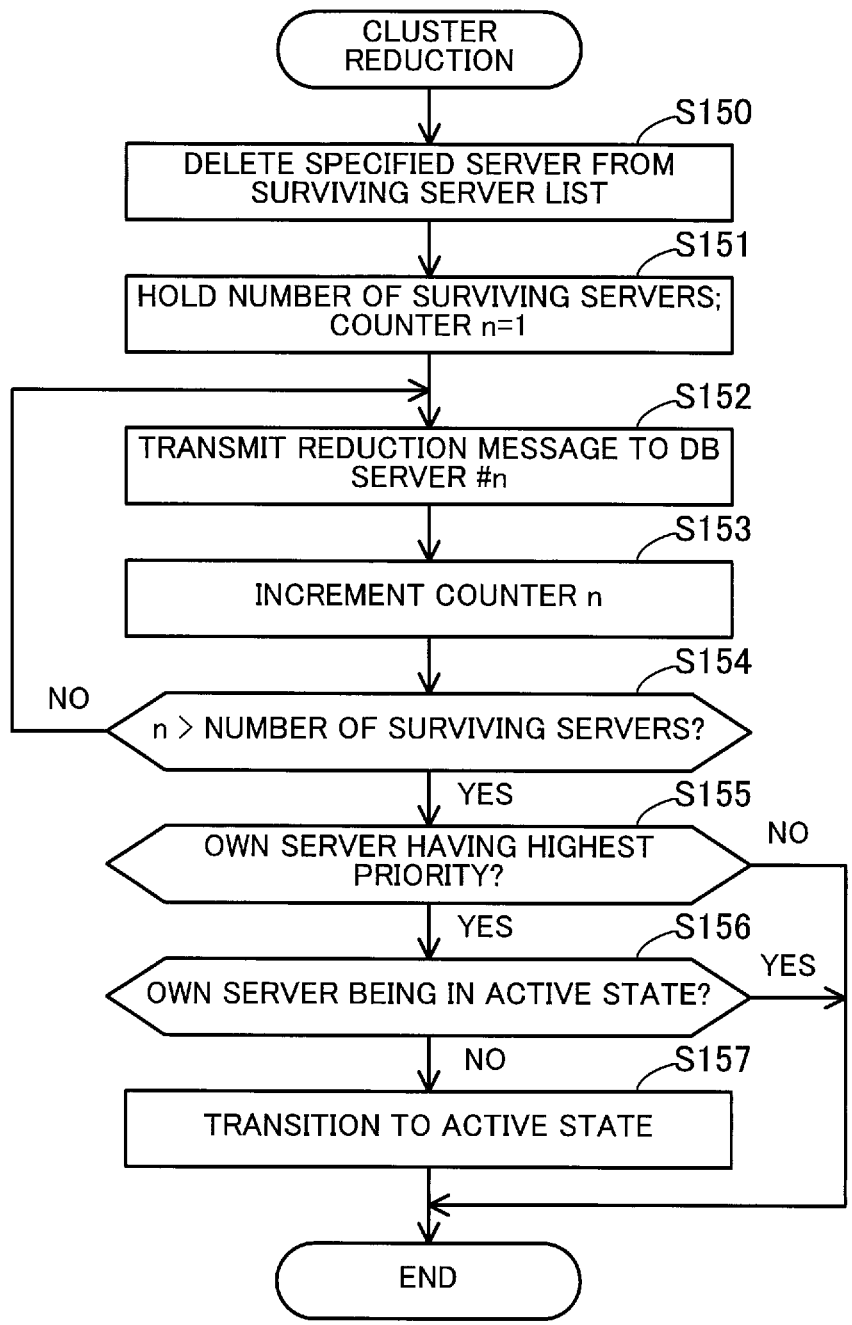
FIG. 21 is a flowchart illustrating an exemplary cluster fallback procedure.

FIG. 21 is a flowchart illustrating an exemplary cluster fallback procedure.

The cluster fallback process is performed at steps S137 and S142 described above, and at step S210 which will be described below, respectively.

(S150) The cluster control unit 132 deletes information of the specified DB server from the surviving server list 143 stored in the server information storage unit 123. (S151) The cluster control unit 132 holds the number of surviving servers registered in the surviving server list 143 (except for the one to be deleted this time). In addition, the cluster control unit 132 initializes the counter n to one. (S152) The cluster control unit 132 transmits a fallback message to the n-th DB server registered in the surviving server list 143. The fallback message includes information indicating the DB server to be disconnected from the cluster system (e.g., server ID of the DB server).

(S153) The cluster control unit 132 increments the counter n. (S154) The cluster control unit 132 determines whether the value of the counter n is larger than the number of surviving servers held at step S151. The process flow proceeds to step S155 when the condition is satisfied, or proceeds to step S152 when the condition is not satisfied. (S155) The cluster control unit 132 determines whether the priority of the DB server 100 is the highest among the DB servers surviving after the specified DB server has been disconnected. The process flow proceeds to step S156 when the priority of the DB server 100 is the highest; otherwise the cluster fallback process is terminated.

(S156) The cluster control unit 132 determines whether the current state of the DB server 100 is the active state. The cluster fallback process is terminated when the DB server 100 is in the active state; otherwise the process flow proceeds to step S157. (S157) The cluster control unit 132 makes the state of the DB server 100 transition to the active state. Accordingly, the DB server 100 will execute transactions and respond to the business servers 20 and 20a, in place of the disconnected DB server.

Figure 22:
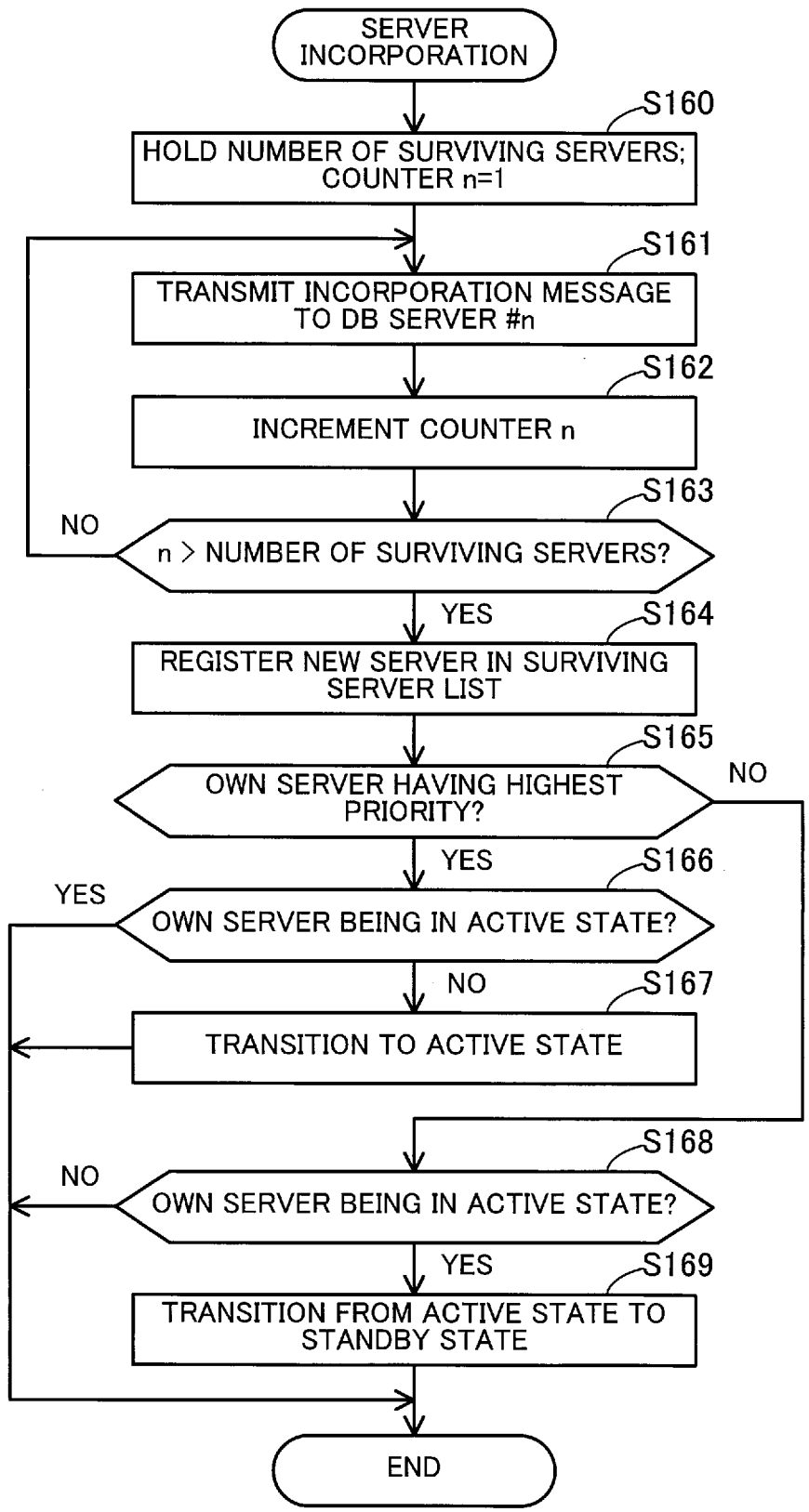
FIG. 22 is a flowchart illustrating an exemplary server incorporation procedure.

FIG. 22 is a flowchart illustrating an exemplary server incorporation procedure.

The server incorporation process is performed at step S144 described above.

(S160) The cluster control unit 132 holds the number of surviving servers registered in the surviving server list 143. In addition, the cluster control unit 132 initializes the counter n to one. (S161) The cluster control unit 132 transmits an incorporation message to the n-th DB server registered in the surviving server list 143. The incorporation message includes information indicating a DB server to be incorporated into the cluster system (e.g., server ID of the DB server). (S162) The cluster control unit 132 increments the counter n.

(S163) The cluster control unit 132 determines whether the value of the counter n is larger than the number of surviving servers held at step S160. The process flow proceeds to step S164 when the condition is satisfied, or proceeds to step S161 when the condition is not satisfied. (S164) The cluster control unit 132 registers a new DB server in the surviving server list 143. (S165) The cluster control unit 132 determines whether the priority of the DB server 100 is the highest among the DB servers surviving after the new DB server has been added. The process flow proceeds to step S166 when the priority of the DB server 100 is the highest; otherwise the process flow proceeds to step S168.

(S166) The cluster control unit 132 determines whether the current state of the DB server 100 is the active state. The server incorporation process is terminated when the DB server 100 is in the active state, or proceeds to step S167 when the DB server 100 is not in the active state. (S167) The cluster control unit 132 makes the state of the DB server transition to the active state. The server incorporation process is then terminated.

(S168) The cluster control unit 132 determines whether the current state of the DB server 100 is the active state. The process flow proceeds to step S169 when the DB server 100 is in the active state, or the server incorporation process is terminated when the DB server 100 is not in the active state. (S169) The cluster control unit 132 makes the state of the DB server 100 transition to the standby state from the active state. Accordingly, the added DB server will execute transactions and respond to the business servers 20 and 20a, in place of the DB server 100. The priority of the DB server to be incorporated is specified from the terminal apparatus 31, for example. The incorporation instruction may include information indicating the priority.

Figure 23:
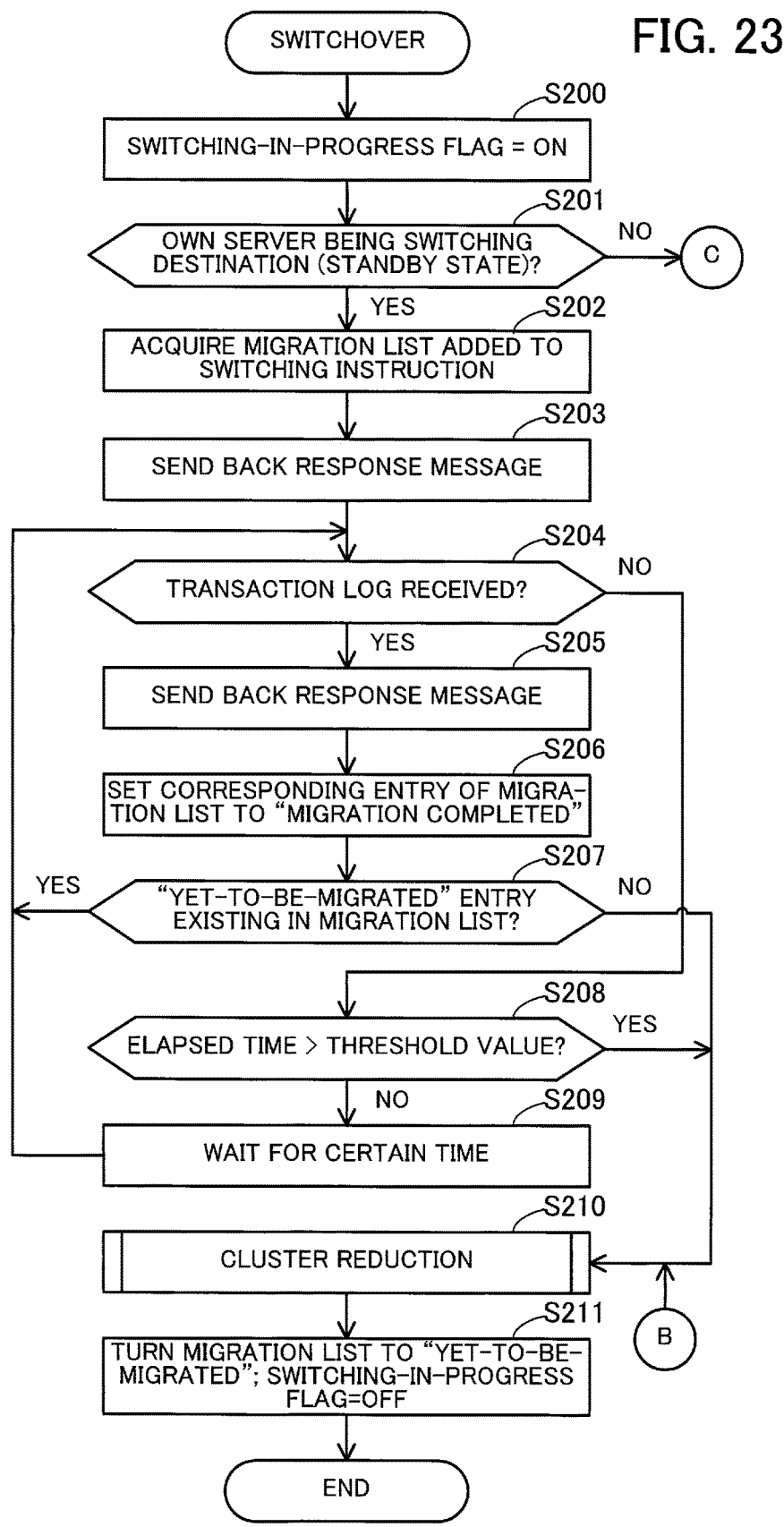
FIG. 23 is a flowchart illustrating an exemplary switchover procedure.

FIG. 23 is a flowchart illustrating an exemplary switchover procedure.

The switchover process is performed when a switching instruction is received.

(S200) The switching unit 133 sets a switching-in-progress flag of the DB server 100 to ON. The switching-in-progress flag is a flag indicating whether or not the DB server 100 is performing switchover as a switching source or a switching destination. The switching-in-progress flag of the DB server 100 being ON in the active state indicates that the process is in the course of migrating a transaction from the DB server 100 to another DB server and disconnecting the DB server 100 from the cluster system. The switching-in-progress flag of the DB server 100 being ON in the standby state indicates that the process is in the course of migrating a transaction from another DB server to the DB server 100 and turning the DB server 100 to the active state.

(S201) The switching unit 133 determines whether the DB server 100 is the switching destination of switchover, i.e., whether the DB server 100 is in the standby state. The process flow proceeds to step S202 when the DB server 100 is the switching destination, or proceeds to step S212 when the DB server 100 is the switching source.

(S202) The switching unit 133 acquires the migration list 141 added to the switching instruction received from the switching source DB server, and stores it in the migration list storage unit 124. (S203) The switching unit 133 sends back to the switching source DB server a response message indicating that the migration list 141 has been received. On this occasion, the switching unit 133 holds the return time of the response message. (S204) The switching unit 133 determines whether a transaction log has been received from the switching source DB server. The process flow proceeds to step S205 when the transaction log has been received, or proceeds to step S208 when no transaction log has been received. The transaction log received from the switching source DB server is stored in the log storage unit 122.

(S205) The switching unit 133 sends back to the switching source DB server a response message indicating that a transaction log has been received. (S206) The switching unit 133 retrieves an entry corresponding to the received transaction log from the migration list 141, and updates the migration state of the retrieved entry to "2" (migration completed). The entry corresponding to the received transaction log may be retrieved using a transaction ID, for example. (S207) The switching unit 133 determines whether there exists in the migration list 141 an entry whose migration state is "0" (yet to be migrated), i.e., whether there exists a transaction which is not yet migrated. The process flow proceeds to step S204 when there exists a yet-to-be-migrated transaction, or proceeds to step S210 when there is no such transaction.

(S208) The switching unit 133 determines whether the elapsed time since the return of the response message has exceeded a threshold value at step S203. A value of a parameter added to the configuration file 142 may be used as the threshold value. The process flow proceeds to step S210 when the condition is satisfied, or proceeds to step S209 when the condition is not satisfied. (S209) The switching unit 133 waits for a certain time (e.g., 10 ms, or a value of a parameter added to the configuration file 142 may be used). Subsequently, the process flow proceeds to step S204.

(S210) The cluster control unit 132 specifies the switching source DB server as the DB server to be disconnected from the cluster system, and performs the cluster fallback procedure illustrated in FIG. 21. Accordingly, the connection between the business server 20/20a and the switching source DB server is disconnected, and the DBMS thereof is terminated. (S211) The cluster control unit 132 updates the migration state of all the entries of the migration list 141 to "0" (yet to be migrated). In addition, the cluster control unit 132 sets back the switching-in-progress flag of the DB server 100 from ON to OFF.

Figure 24:
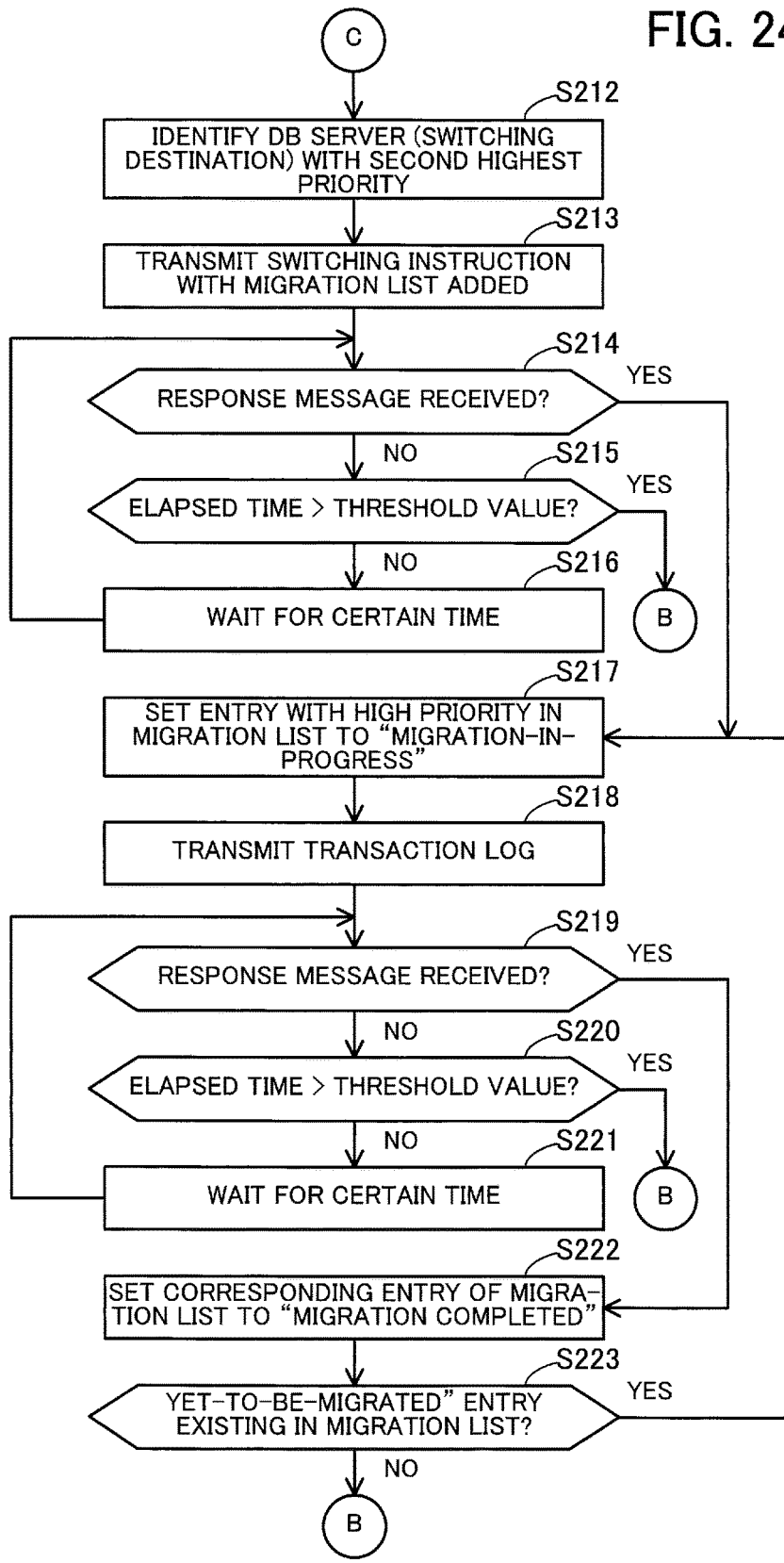
FIG. 24 is a flowchart illustrating an exemplary switchover procedure (continued)

FIG. 24 is a flowchart illustrating an exemplary switchover procedure (continued).

(S212) The switching unit 133 finds, from among the DB servers registered in the surviving server list 143 stored in the server information storage unit 123, a DB server in the standby state with the second highest priority, and specifies the found DB server as the switching destination. (S213) The switching unit 133 adds, to the switching instruction received from the terminal apparatus 31, the migration list 141 stored in the migration list storage unit 124, and transmits it to the switching destination DB server specified at step S212. On this occasion, the switching unit 133 holds the transmission time of the switching instruction.

(S214) The switching unit 133 determines whether a response message to the switching instruction has been received from the switching destination DB server. The process flow proceeds to step S217 when the response message has been received, or proceeds to step S215 when no response message has been received. (S215) The switching unit 133 determines whether the elapsed time since the transmission of the switching instruction has exceeded a threshold value. The threshold value may be the same value used at step S208. The process flow proceeds to step S210 when the condition is satisfied, or proceeds to step S216 when the condition is not satisfied. (S216) The switching unit 133 waits for a certain time (e.g., 10 ms, or a value of a parameter added to the configuration file 142 may be used). Subsequently, the process flow proceeds to step S214.

(S217) The switching unit 133 selects an entry whose migration state is "0" (yet to be migrated) with the highest priority in the migration list 141, and updates the migration state of the selected entry to "1" (migration-in-progress). An entry with a high priority is registered at a forward position in the migration list 141. As a general rule, an entry corresponding to a transaction having occurred earlier exists more forward in the migration list 141. However, as will be described below, the order of entry may be changed during switchover. In addition, the switching unit 133 may select entries in any order except for an entry whose order has been explicitly moved forward.

(S218) The switching unit 133 acquires a transaction log corresponding to the entry selected at step S217 from the log storage unit 122, and transmits it to the switching destination DB server. A transaction log corresponding to an entry may be retrieved using the transaction ID, for example. On this occasion, the switching unit 133 holds the transmission time of the transaction log. (S219) The switching unit 133 determines whether a response message to the transaction log has been received from the switching destination DB server. The process flow proceeds to step S222 when the response message has been received, or proceeds to step S220 when no response message has been received.

(S220) The switching unit 133 determines whether the elapsed time since the transmission of the transaction log has exceeded a threshold value. The threshold value may be the same value used at steps S208 or S215. The process flow proceeds to step S210 when the condition is satisfied, or proceeds to step S221 when the condition is not satisfied. (S221) The switching unit 133 waits for a certain time (e.g., 10 ms, or a value of a parameter added to the configuration file 142 may be used). Subsequently, the process flow proceeds to step S219.

(S222) The switching unit 133 updates the migration state of the entry of the migration list 141 selected at step S217 to "2" (migration completed). (S223) The switching unit 133 determines whether or not there exists in the migration list 141 an entry whose migration state is "0" (yet to be migrated), i.e., whether there exists a yet-to-be-migrated transaction. The process flow proceeds to step S217 when there exists the yet-to-be-migrated transaction, or proceeds to step S210 when there is no such transaction.

Figure 25:
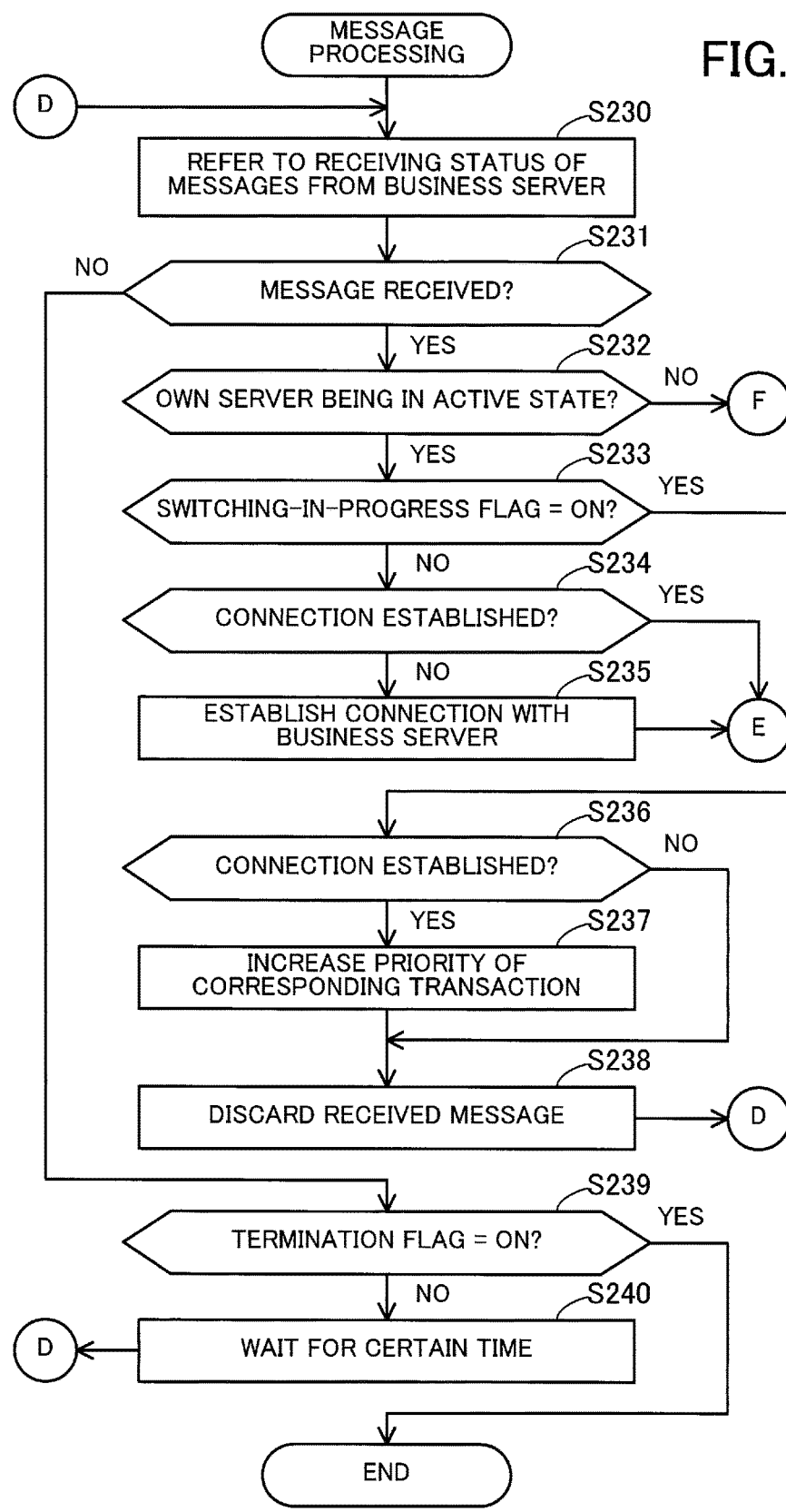
FIG. 25 is a flowchart illustrating an exemplary message processing procedure (first diagram)

FIG. 25 is a flowchart illustrating an exemplary message processing procedure (first diagram).

The message processing is performed in the aforementioned message receiving thread.

(S230) The message processing unit 134 refers to the receiving status of messages from the business servers 20 and 20a. (S231) The message processing unit 134 determines whether a message has been received from either business server. The message which may be received from the business servers 20 and 20a includes a connection request for establishing connection, a processing request indicating retrieval or updating, a commit request, and a rollback request. The process flow proceeds to step S232 when the message has been received, or proceeds to step S239 when no message has been received.

(S232) The message processing unit 134 determines whether the DB server 100 is in the active state. The process flow proceeds to step S233 when the DB server 100 is in the active state, or proceeds to step S254 when the DB server 100 is not in the active state. (S233) The message processing unit 134 determines whether the switching-in-progress flag of the DB server 100 is ON. The process flow proceeds to step S236 when the switching-in-progress flag is ON, or proceeds to step S234 when the switching-in-progress flag is OFF.

(S234) The message processing unit 134 determines whether a connection has been already established between the DB server 100 and the business server of message transmission source. When no connection has been established, the received message may be a connection request. The process flow proceeds to step S241 when the connection has been already established, or proceeds to step S235 when no connection has been established. (S235) The message processing unit 134 establishes a connection between the DB server 100 and transmission source business server. On this occasion, the message processing unit 134 provides the connection with a session ID calculated from the client ID, the client IP address, the client port number, the client process ID, and the client thread ID. Subsequently, the process flow proceeds to step S241.

(S236) The message processing unit 134 determines whether a connection has been already established between the DB server 100 and the transmission source business server. The process flow proceeds to step S237 when the connection has been already established, or the process flow proceeds to step S238 when no connection has been established. (S237) When the message includes a transaction ID, the message processing unit 134 retrieves an entry including the transaction ID from the migration list 141, and increases the priority of the retrieved entry in the migration list 141. For example, the retrieved entry is moved to the foremost position among the entries whose migration state is "0" (yet to be migrated). In other words, the message processing unit 134 increases the migration priority of the transaction to which the message belongs. (S238) The message processing unit 134 discards the received message without performing the process requested in the message. Subsequently, the process flow proceeds to step S230.

(S239) The message processing unit 134 determines whether the termination flag of the DB server 100 is ON. The message processing is terminated when the termination flag is ON, or the process flow proceeds to step S240 when the termination flag is OFF. (S240) The message processing unit 134 waits for a certain time (e.g., 10 ms, or a value of a parameter added to the configuration file 142 may be used). Subsequently, the process flow proceeds to step S230.

Figure 26:
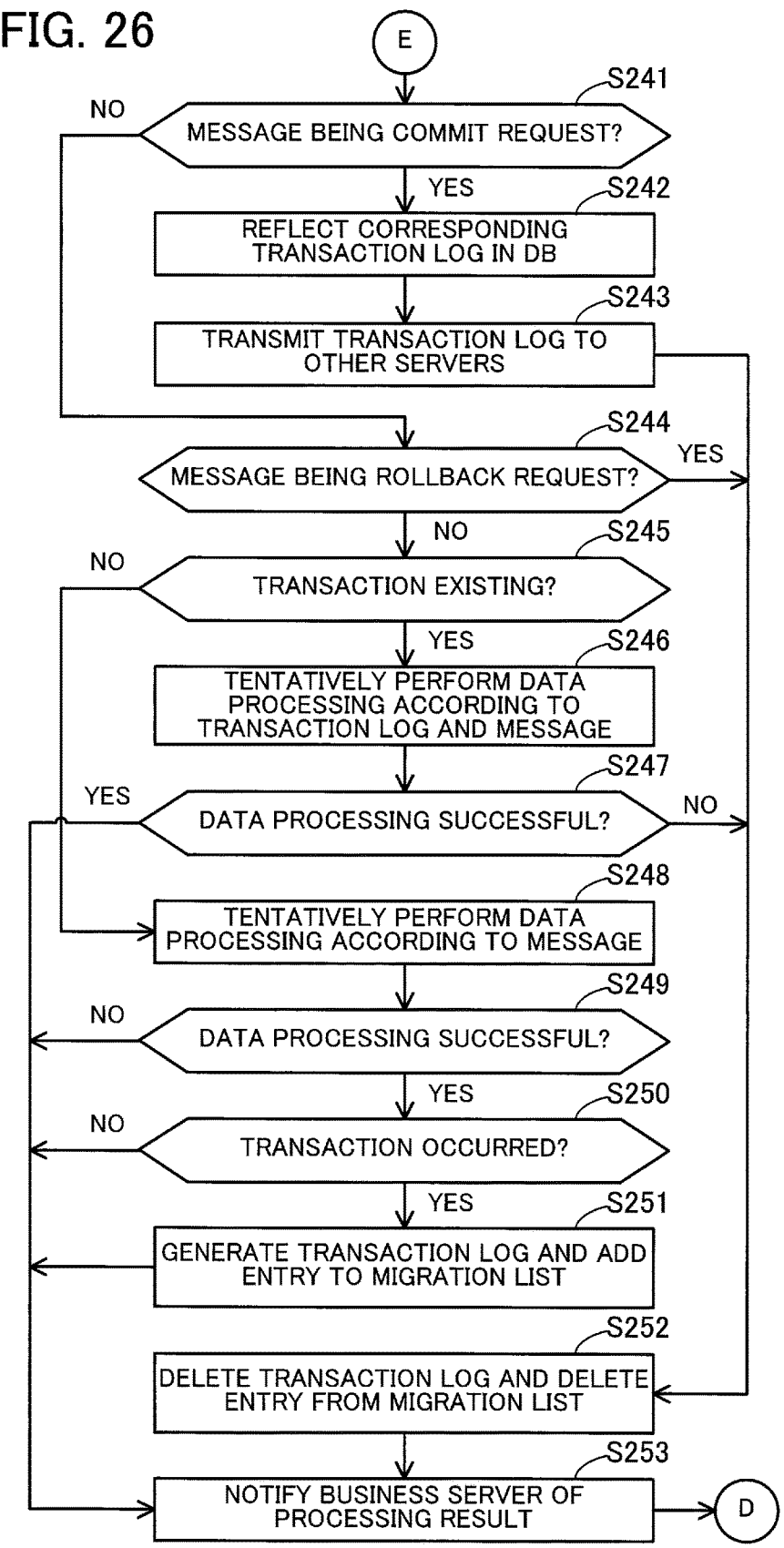
FIG. 26 is a flowchart illustrating an exemplary message processing procedure (second diagram)

FIG. 26 is a flowchart illustrating an exemplary message processing procedure (second diagram).

(S241) The message processing unit 134 determines whether the received message is a commit request. The process flow proceeds to step S242 when the received message is a commit request, or proceeds to step S244 when the received message is not a commit request. (S242) The message processing unit 134 acquires, from the log storage unit 122, a transaction log corresponding to the transaction specified by the commit request, and reflects, in the database 121, the update data included in the transaction log. The database 121 is updated according to the update data. (S243) The message processing unit 134 specifies a DB server in the standby state (e.g., the DB servers 100a and 100b), referring to the surviving server list 143, and transmits the aforementioned transaction log to all the DB servers in the standby state. Subsequently, the process flow proceeds to step S252.

(S244) The message processing unit 134 determines whether the received message is a rollback request. The process flow proceeds to step S252 when the received message is a rollback request, or proceeds to step S245 when the received message is not a rollback request. In the latter case, it is conceivable that the message is mainly a processing request such as a search request or an update request. (S245) The message processing unit 134 determines whether there exists a transaction corresponding to the received message. For example, when the message includes a transaction ID and the transaction ID is registered in the migration list 141, it is determined that there exists a transaction. The process flow proceeds to step S246 when there exists a transaction, or proceeds to step S248 when there is none.

(S246) The message processing unit 134 acquires, from the log storage unit 122, a transaction log corresponding to the transaction specified in the message, and tentatively performs data processing according to the transaction log and the input data included in the message. When the message is a search request, the message processing unit 134 may continue searching data from the database 121 to the end. When the message is an update request, the message processing unit 134 stores the details of the updating in the transaction log without updating the database 121. (S247) The message processing unit 134 determines whether the data processing has been successful. The process flow proceeds to step S253 when the data processing has been successful, or proceeds to step S252 when the data processing has been a failure.

(S248) The message processing unit 134 tentatively performs data processing, according to the input data included in the message. (S249) The message processing unit 134 determines whether the data processing has been successful. The process flow proceeds to step S250 when the data processing has been successful, or proceeds to step S253 when the data processing has been a failure. (S250) The message processing unit 134 determines whether a transaction occurs due to the data processing. A transaction may occur when the updating process has been successful up to immediately before updating the database 121. Although a transaction processing may also occur due to reference processing, it is not accompanied with data updating. The process flow proceeds to step S251 when a transaction occurs, or proceeds to step S253 when no transaction occurs.

(S251) The message processing unit 134 generates a transaction log including a new transaction ID, details of the updating which are yet to be reflected in the database 121, or the like, and stores the transaction log in the log storage unit 122. In addition, the message processing unit 134 registers an entry including the new transaction ID, or the like, in the migration list 141. Subsequently, the process flow proceeds to step S253.

(S252) The message processing unit 134 deletes the transaction log of step S242 from the log storage unit 122, and deletes the entry corresponding to the transaction log from the migration list 141. (S253) The message processing unit 134 notifies the processing result to the business server which has transmitted the message. The notification of the result of the search request may include the retrieved data. The notification of the result of the update request may include information indicating whether the updating has succeeded or failed. The notification of the result of the commit request or the rollback request includes information indicating whether the commit or rollback has succeeded or failed. Subsequently, the process flow proceeds to step S230.

Figure 27:
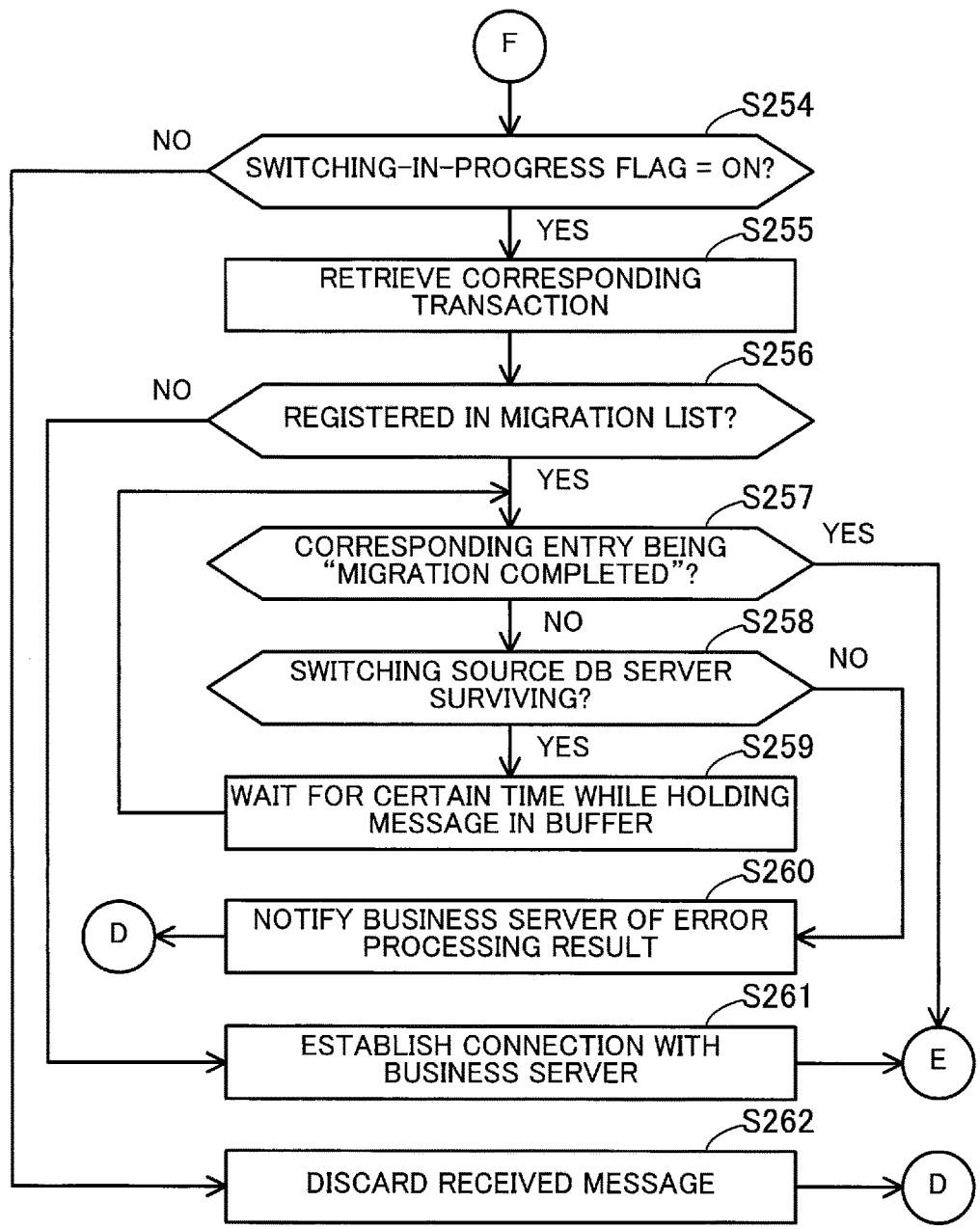
FIG. 27 is a flowchart illustrating an exemplary message processing procedure (third diagram)

FIG. 27 is a flowchart illustrating an exemplary message processing procedure (third diagram).

(S254) The message processing unit 134 determines whether the switching-in-progress flag of the DB server 100 is ON. The process flow proceeds to step S255 when the switching-in-progress flag is ON, or proceeds to step S262 when the switching-in-progress flag steps is OFF. (S255) When the received message includes a transaction ID, the message processing unit 134 retrieves an entry including the transaction ID from the migration list 141. In other words, the message processing unit 134 retrieves the transaction specified in the message. (S256) The message processing unit 134 determines whether the message has a transaction specified therein and also the specified transaction is registered in the migration list 141. The process flow proceeds to step S257 when the condition is satisfied, or proceeds to step S261 when the condition is not satisfied.

(S257) The message processing unit 134 determines whether the migration state of the entry retrieved at step S255 is "2" (migration completed). The process flow proceeds to step S241 when migration of the transaction has been completed, or proceeds to step S258 when migration has not been completed (when yet to be migrated). (S258) It is determined whether the DB server of switching source in switchover is normally surviving. The process flow proceeds to step S259 when the switching source DB server is normally surviving; otherwise the process flow proceeds to step S260. (S259) The message processing unit 134 holds the received message in the message buffer 125, and waits for a certain time (e.g., 10 ms, or a value of a parameter added to the configuration file 142 may be used). Subsequently, the process flow proceeds to step S257.

(S260) The message processing unit 134 notifies the processing result indicating an error to the business server which has transmitted the message. Subsequently, the process flow proceeds to step S230. (S261) The message processing unit 134 establishes a connection between the DB server 100 and the business server which has transmitted the message. Subsequently, the process flow proceeds to step S241. (S262) The message processing unit 134 discards the message without performing the processing requested in the received message. Subsequently, the process flow proceeds to step S230.

Next, transaction processing by another database system is exemplified and compared with the transaction processing by the aforementioned DB servers 100, 100a and 100b.

Figure 28:
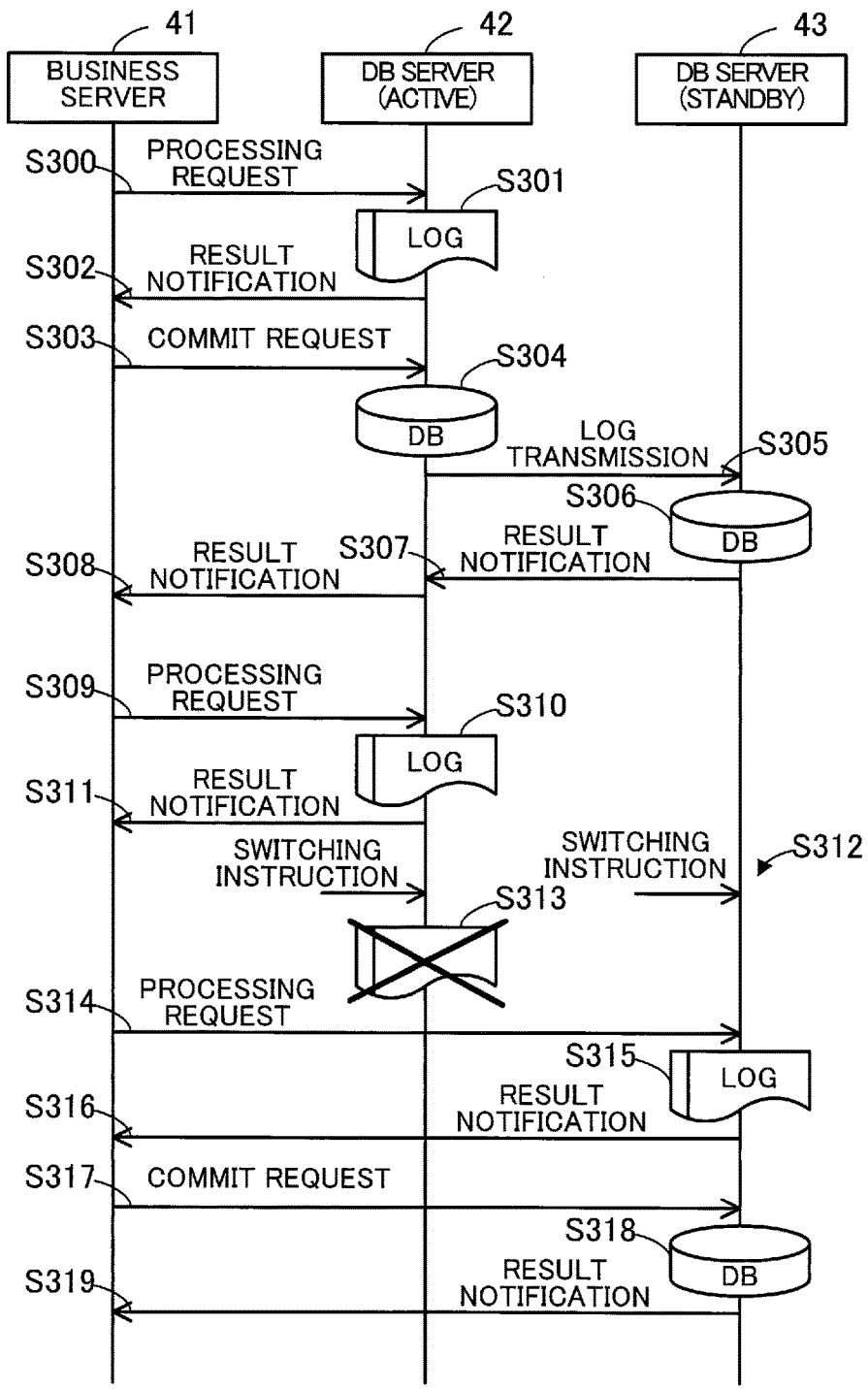
FIG. 28 is a sequence diagram illustrating an exemplary first another transaction processing.

FIG. 28 is a sequence diagram illustrating an exemplary first another transaction processing.

In the exemplary first another transaction processing, a database system includes a business server 41, a DB server 42 in the active state, and a DB server 43 in the standby state.

(S300) The business server 41 transmits a processing request to the DB server 42. (S301) The DB server 42 keeps track of the details of the updating in the transaction log without reflecting the same in the database. (S302) The DB server 42 notifies the business server 41 of the processing result.

(S303) The business server 41 transmits a commit request to the DB server 42. (S304) The DB server 42 updates the database of the DB server 42, using the transaction log. (S305) The DB server 42 transmits the transaction log to the DB server 43. (S306) The DB server 43 updates the database of the DB server 43, using the transaction log. (S307) The DB server 43 notifies the DB server 42 of the processing result. (S308) The DB server notifies the business server 41 of the processing result.

(S309) The business server 41 transmits a processing request to the DB server 42. (S310) The DB server 42 keeps track of the details of the updating in the transaction log. (S311) The DB server 42 notifies the business server 41 of the processing result. (S312) A switching instruction is input to the DB servers 42 and 43. (S313) The DB server 42 rolls back the transaction being executed and discards the transaction log being held. Accordingly, it becomes possible to terminate the DB server 42, and the DB server 43 transitions from the standby state to the active state.

(S314) Upon detecting a switchover, the business server 41 transmits a processing request indicating the same process as step S309 to the DB server 43 in order to redo, from scratch, the transaction having been executed. (S315) The DB server 43 keeps track of the details of the updating in the transaction log. (S316) The DB server 43 notifies the business server 41 of the processing result. (S317) The business server 41 transmits a commit request to the DB server 43. (S318) The DB server 43 updates the database of the DB server 43, using the transaction log. (S319) The DB server 43 notifies the business server 41 of the processing result.

As thus described, in the exemplary first another transaction processing, the database of the DB server 43 is synchronized with the DB server 42 when a transaction is committed in the DB server 42. The DB server 43 does not hold the transaction log about the transaction being executed in the DB server 42. In addition, the DB server 42 is immediately disconnected from the database system when switchover from the DB server 42 to the DB server 43 is instructed, and the transaction being executed in the DB server 42 is not handed over to the DB server 43.

However, in the exemplary first another transaction processing, processing requests for redoing rolled back transactions from scratch will concentrate on the DB server 43 immediately after the switchover. Accordingly, the load on the switching destination DB server 43 may increase immediately after the switchover, whereby responses to processing requests may be temporarily delayed. According to the transaction processing performed by the aforementioned DB servers 100, 100a and 100b, therefore, transactions are handed over at the time of switchover, whereby the load on the switching destination DB server may be reduced. Therefore, the switchover may be smoothly performed even if the business servers 20 and 20a are not terminated.

Figure 29:
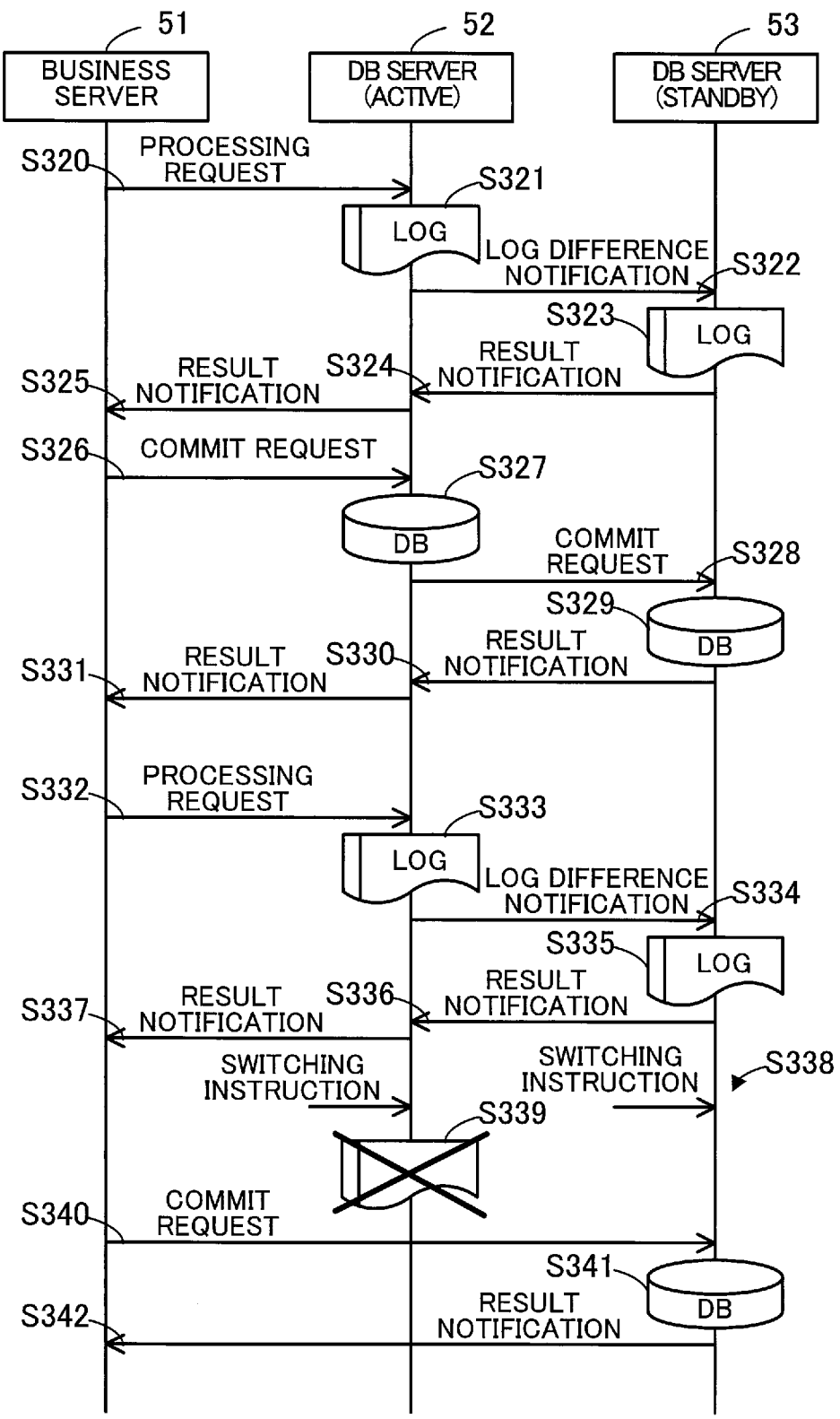
FIG. 29 is a sequence diagram illustrating an exemplary second another transaction processing.

FIG. 29 is a sequence diagram illustrating an exemplary second another transaction processing.

In the exemplary second another transaction processing, the database system includes a business server 51, a DB server 52 in the active state, and a DB server 53 in the standby state.

(S320) The business server 51 transmits a processing request to the DB server 52. (S321) The DB server 52 keeps track of the details of the updating in the transaction log without reflecting the same in the database. (S322) The DB server 52 notifies the DB server 53 of a difference between transaction logs. (S323) The DB server 53 generates or updates a transaction log based on the notified difference. (S324) The DB server 53 notifies the DB server 52 of the processing result. (S325) The DB server 52 notifies the business server 51 of the processing result.

(S326) The business server 51 transmits a commit request to the DB server 52. (S327) The DB server 52 updates the database of the DB server 52, using the transaction log. (S328) The DB server 52 transfers the commit request to the DB server 53. (S329) The DB server 53 updates the database, using the transaction log held by the DB server 53. (S330) The DB server 53 notifies the DB server 52 of the processing result. (S331) The DB server 52 notifies the business server 51 of the processing result.

(S332) The business server 51 transmits a processing request to the DB server 52. (S333) The DB server 52 keeps track of the details of the updating in the transaction log. (S334) The DB server 52 notifies the DB server 53 of a difference between transaction logs. (S335) The DB server 53 generates or updates a transaction log based on the notified difference. (S336) The DB server notifies the DB server 52 of the processing result. (S337) The DB server 52 notifies the business server 51 of the processing result.

(S338) A switching instruction is input to the DB servers 52 and 53. (S339) The DB server 52 rolls back the transaction being executed, and discards the transaction log being held. Accordingly, it becomes possible to terminate the DB server 52, and the DB server 53 transitions from the standby state to the active state. (S340) Upon detecting a switchover, the business server 51 transmits a commit request to the DB server 53 as a continuation of the transaction, since the state of the transaction being executed has been synchronized between the DB servers 52 and 53. (S341) The DB server 53 updates the database of the DB server 53, using the transaction log. (S342) The DB server 53 notifies the business server 51 of the processing result.

As thus described, in the exemplary second another transaction processing, when a transaction log is updated in the DB server 52, a transaction log is updated also in the DB server 53 in sync therewith. Therefore, it is possible for the switching destination DB server 53 to take over the transaction even if the DB server 52 is immediately disconnected from the database system.

In the exemplary second another transaction processing, however, transaction logs are continuously synchronized between the DB servers 52 and 53, and therefore the load on the DB server 53 may increase even in the standby state. Accordingly, it becomes difficult to effectively use computational resources of the DB server 53 for processing other than transaction processing, such as using the DB server 53 for data search. In addition, responses to the business server 51 may be delayed due to continuously occurring communication between the DB servers 52 and 53. In contrast, according to the transaction processing performed by the aforementioned DB servers 100, 100*a* and 100*b*, a standby DB server normally does not hold transaction logs about transactions being executed by the active DB server. Therefore, the load on the standby DB server may be reduced, and additionally the response speed increases.

Figure 30:
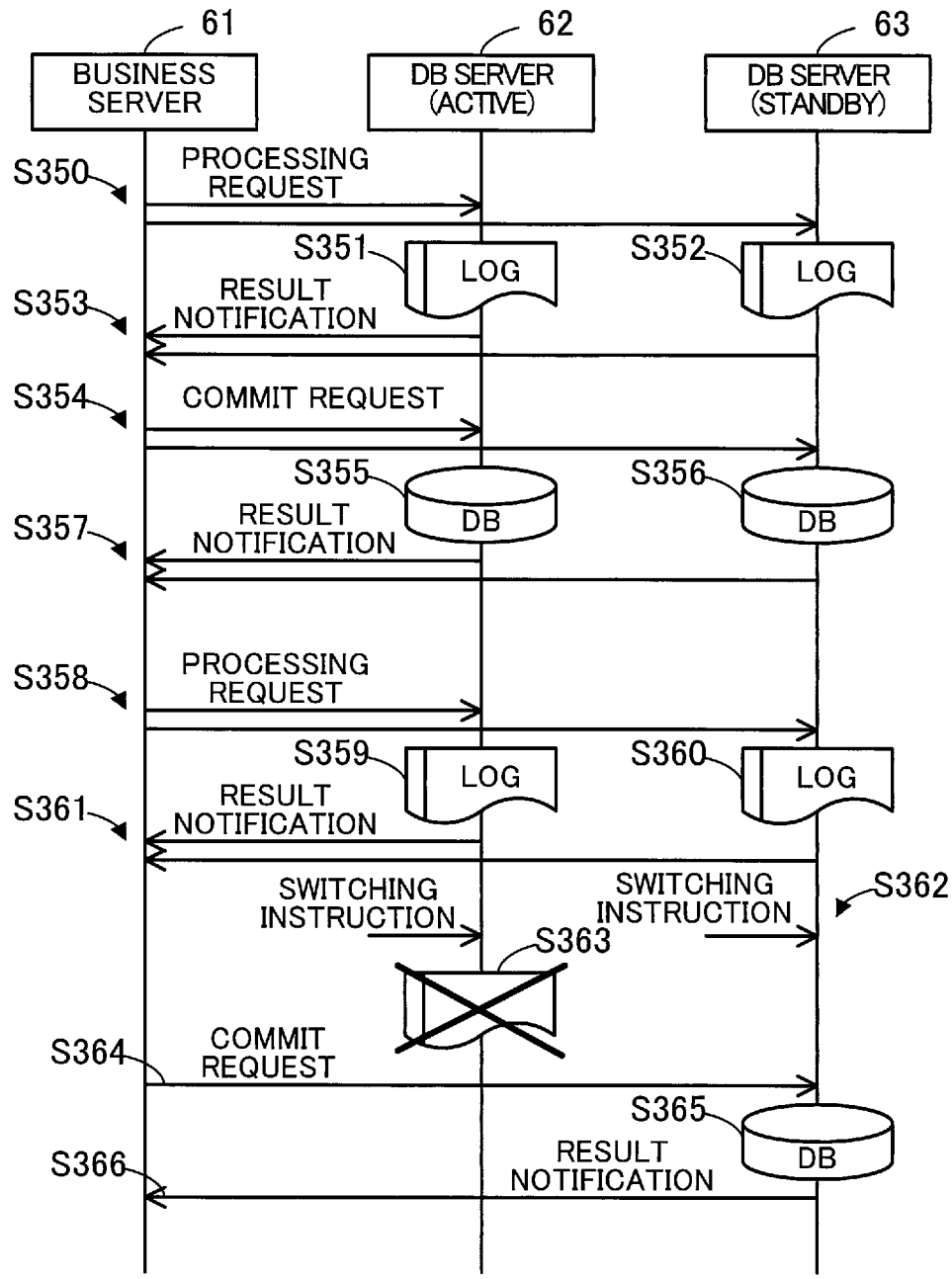
FIG. 30 is a sequence diagram illustrating an exemplary third another transaction processing.

FIG. 30 is a sequence diagram illustrating an exemplary third another transaction processing.

In the exemplary third another transaction processing, the database system includes a business server 61, a DB server 62 in the active state, and a DB server 63 in the standby state.

(S350) The business server 61 transmits a processing request to both the DB servers 62 and 63. (S351) The DB server 62 keeps track of the details of the updating in the transaction log without reflecting the same in the database. (S352) The DB server 63 generates or updates a transaction log similarly to the DB server 62. (S353) The DB server 62 notifies the business server 61 of the processing result. The DB server 63 notifies the business server 61 of the processing result.

(S354) The business server 61 transmits a commit request to both the DB servers 62 and 63. (S355) The DB server 62 updates the database of the DB server 62, using the transaction held by the DB server 62. (S356) The DB server 63 updates, independently from the DB server 62, the database of the DB server 63, using the transaction held by the DB server 63. (S357) The DB server 62 notifies the business server 61 of the processing result. The DB server 63 notifies the business server 61 of the processing result.

(S358) The business server 61 transmits a processing request to both the DB servers 62 and 63. (S359) The DB server 62 keeps track of the details of the updating in the transaction log. (S360) The DB server 63 generates or updates a transaction log similarly to the DB server 62. (S361) The DB server 62 notifies the business server 61 of the processing result. The DB server 63 notifies the business server 61 of the processing result.

(S362) A switching instruction is input to the DB servers 62 and 63. (S363) The DB server 62 rolls back the transaction being executed, and discards the transaction log being held. Accordingly, it becomes possible to terminate the DB server 62, and the DB server 63 transitions from the standby state to the active state. (S364) Upon detecting a switchover, the business server 61 transmits a commit request to the DB server 63 as a continuation of the transaction, since the transaction was being executed in the DB servers 62 and 63 independently from each other. (S365) The DB server 63 updates the database of the DB server 63, using the transaction log. (S366) The DB server 63 notifies the business server 61 of the processing result.

As thus described, in the exemplary third another transaction processing, a processing request is transmitted from the business server 61 to both the DB servers 62 and 63, and the processing result is notified from both the DB servers 62 and 63 to the business server 61. Similar transactions are executed in both the DB servers 62 and 63. Therefore, it is possible for the switching destination DB server 63 to execute the rest of the transaction, even if the DB server 62 is immediately disconnected from the database system.

In the exemplary third another transaction processing, however, the load on the DB server 63 may increase since the DB server 63 in the standby state continuously executes transactions similarly to the DB server 62 in the active state. Accordingly, it becomes difficult to effectively use the computational resources of the DB server 63 for processing other than transaction processing. In contrast, according to the transaction processing performed by the aforementioned DB servers 100, 100*a* and 100*b*, a standby DB server normally does not directly execute transactions, whereby the load on the standby DB server may be reduced.

Figure 31:
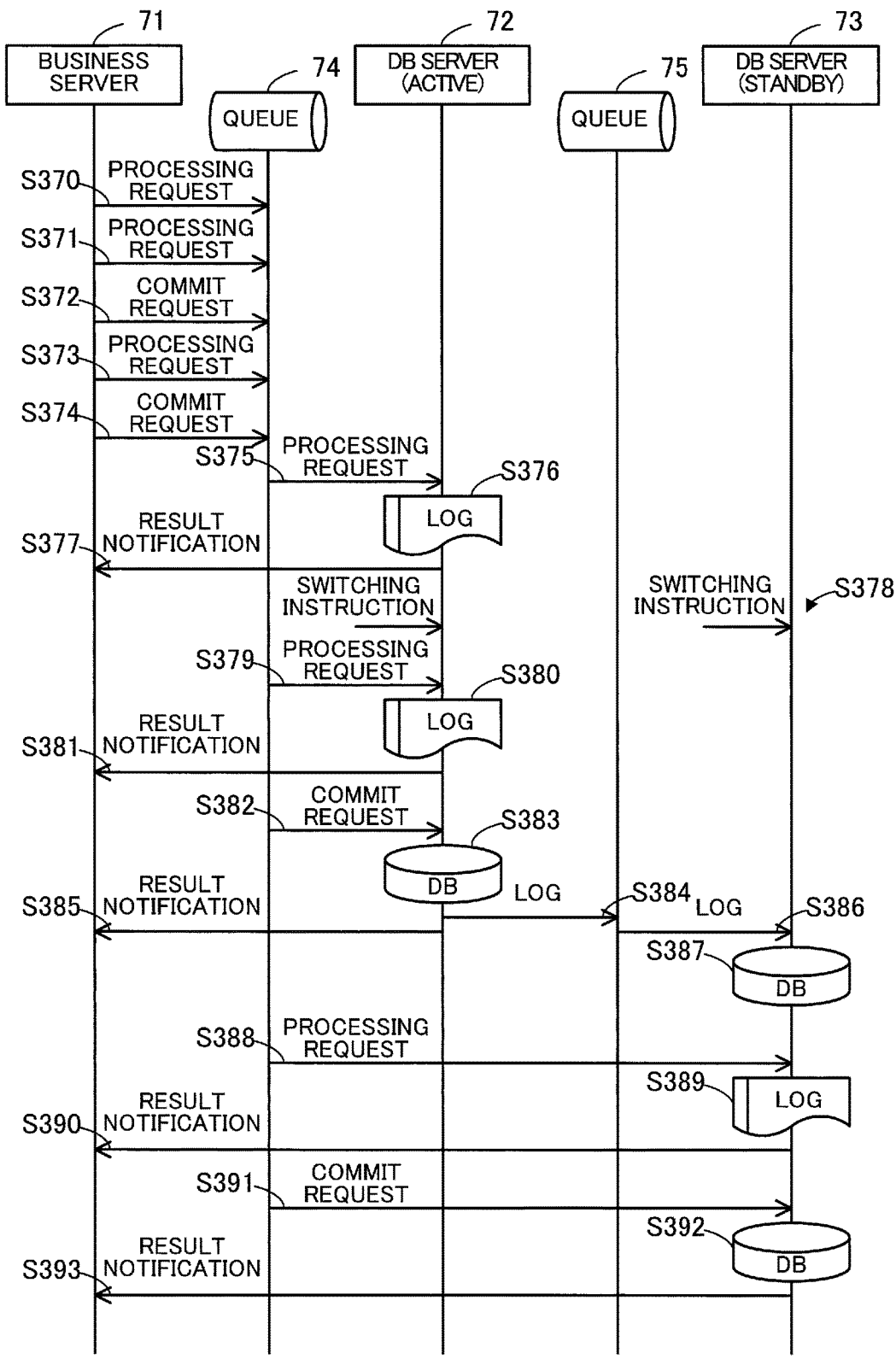
FIG. 31 is a sequence diagram illustrating an exemplary fourth another transaction processing.

FIG. 31 is a sequence diagram illustrating an exemplary fourth another transaction processing.

In the exemplary fourth another transaction processing, the database system includes a business server 71, a DB server 72 in the active state, and a DB server 73 in the standby state. In addition, the database system includes a queue 74 to which the business server 71 and the DB servers 72 and 73 may access in common, and a queue 75 to which the DB servers 72 and 73 may access in common. The queues 74 and 75 may be implemented on an apparatus other than the business server 71 and the DB servers 72 and 73.

(S370) The business server 71 stores a processing request #1-1 in the queue 74. (S371) The business server 71 stores a processing request #1-2 in the queue 74. (S372) The business server 71 stores a commit request #1 in the queue 74. (S373) The business server 71 stores a processing request #2-1 in the queue 74. (S374) The business server 71 stores a commit request #2 in the queue 74. The queue 74 is a FIFO (First In First Out) type storage area, holding the aforementioned messages in the order of arrival.

(S375) The DB server 72 gets the processing request #1-1 from the top of the queue 74. (S376) The DB server 72 keeps track of the details of the updating in the transaction log without reflecting the same in the database. (S377) The DB server 72 notifies the business server 71 of the processing result. (S378) A switching instruction is input to the DB servers 72 and 73.

(S379) The DB server 72 gets the processing request #1-2 from the top of the queue 74 in order to complete the transaction being executed in the DB server 72. (S380) The DB server 72 keeps track of the details of the updating in the transaction log. (S381) The DB server 72 notifies the business server 71 of the processing result. (S382) The DB server 72 gets the commit request #1 from the top of the queue 74. (S383) The DB server 72 updates the database, using the transaction log. (S384) The DB server 72 stores a transaction log to the queue 75. (S385) The DB server 72 transmits the processing result to the business server 71. Upon detecting that there no longer exists a transaction being executed, the DB server then terminates the retrieval of messages from the queue 74.

(S386) The DB server 73 gets the transaction log from the top of the queue 75. (S387) The DB server 73 updates the database of the DB server 73, using the transaction log. (S388) When there no longer exists a transaction being executed in the DB server 72, the DB server 73 gets the processing request #2-1 from the top of the queue 74 in order to start a new transaction. (S389) The DB server 73 keeps track of the details of the updating in the transaction log. (S390) The DB server 73 notifies the business server 71 of the processing result. (S391) The DB server 73 gets the commit request #2 from the top of the queue 74. (S392) The DB server 73 updates the database, using the transaction log. (S393) The DB server 73 notifies the business server 71 of the processing result.

As thus described, in the exemplary fourth another transaction processing, when a switchover from the DB server 72 to the DB server 73 is instructed, processing requests belonging to the transaction are obtained until the transaction being executed in the DB server 72 is completed. The processing requests having arrived during the aforementioned period to generate new transactions are accumulated in the queue 74. When there no longer exists a transaction being executed, the DB server 73 starts retrieving processing requests.

In the exemplary fourth another transaction processing, however, the switching destination DB server 73 does not start processing until all the transactions being executed in the switching source DB server 72 are completed. Accordingly, a large number of processing requests may be accumulated in the queue 74 when the DB server 73 starts processing, whereby the load on the DB server 73 may increase. In contrast, according to the transaction processing performed by the aforementioned DB servers 100, 100*a* and 100*b*, a plurality of transactions being executed is sequentially handed over to the switching destination DB server, and execution of the transactions taken over in the switching destination DB server may be restarted in sequence. Therefore, the load on the switching destination DB server may be reduced, whereby the switchover may be smoothly performed.

According to the database system of the second embodiment, when the active DB server which is executing transactions is switched, the migration list 141 indicating the transaction being executed is shared between the switching source DB server and the switching destination DB server. Subsequently, the transaction log corresponding to the transaction being executed is migrated to the switching destination DB server, based on the migration list 141. Accordingly, the load on a switching destination DB server immediately after the switchover may be reduced in comparison with the case where the transaction being executed is once rolled back and not handed over to the switching destination DB server. Therefore, it becomes possible to suppress delay of the response time of the database system and perform switchover without terminating the business servers 20 and 20*a*.

In addition, the load on the standby DB server may be reduced in comparison with the case where transaction logs corresponding to transactions before commit are continuously synchronized between DB servers. Therefore, computational resources of the standby DB server may be used for processing other than the transaction of updating the database, such as searching in the database, which leads to effective use of computational resources. In addition, when a message belonging to a certain transaction reaches the switching source DB server, the migration priority is increased so that migration of the transaction occurs earlier than other transactions. Accordingly, the response time to the business servers 20 and 20*a* may be shortened.

As described above, the information processing according to the first embodiment may be implemented by causing the information processing apparatuses 10 and 10*a* to execute programs. The information processing according to the second embodiment may be implemented by causing the business servers 20 and 20*a*, the terminal apparatus 31, and the DB servers 100, 100*a* and 100*b* to execute programs.

The programs may be stored in a computer-readable storage medium (e.g., the storage medium 113). For example, a magnetic disk, an optical disk, a magneto-optical disk, a semiconductor memory, or the like, may be used as the storage medium. The magnetic disk may be an FD and an HDD. The optical disk may be a CD, a CD-R (Recordable)/RW (Rewritable), a DVD, and a DVD-R/RW. The programs may be distributed in a manner stored in a portable storage medium. In such a case, the programs may be copied (installed) for execution from the portable storage medium to another storage medium such as an HDD (e.g., the HDD 103).

In one aspect, apparatuses executing transactions may be smoothly switched.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus that manages a database, comprising:
    a memory that stores one or more sets of update data indicating updating processes yet to be reflected in the database and corresponding to one or more transactions being executed; and
    a processor that performs a process including:
    generating a list indicating the one or more transactions,
    transmitting the list to another information processing apparatus when switching apparatuses executing transactions from the information processing apparatus to the another information processing apparatus, and
    migrating the one or more sets of update data to the another information processing apparatus based on the list.

2. The information processing apparatus according to claim 1, wherein, when two or more sets of update data corresponding to two or more transactions are stored in the memory, the migrating determines an order of migrating the two or more sets of update data to the another information processing apparatus based on the list.

3. The information processing apparatus according to claim 2, wherein, when a processing request belonging to one transaction corresponding to one set of yet-to-be-migrated update data of the two or more transactions is received by the information processing apparatus, the migrating increases a migration priority of the one set of yet-to-be-migrated update data.

4. The information processing apparatus according to claim 1,
wherein, when a first processing request belonging to one transaction is transmitted to the information processing apparatus, a second processing request indicating the same process as that of the first processing request is transmitted to the another information processing apparatus, and
wherein the process further includes discarding the first processing request received by the information processing apparatus, after starting migration of the one or more sets of update data.

5. A control method of a computer that manages a database, comprising:
generating, by a processor, a list indicating one or more transactions being executed;
transmitting, by the processor, the list to another computer when an apparatus executing transactions is switched from the computer to the another computer; and
migrating, by the processor, one or more sets of update data corresponding to the one or more transactions indicating an updating process which is yet to be reflected in the database, to the another computer based on the list.

6. A non-transitory computer-readable storage medium storing a computer program that causes a computer to perform a process comprising:
generating a list indicating one or more transactions being executed;
transmitting the list to another computer when an apparatus executing transactions is switched from the computer to the another computer; and
migrating one or more sets of update data corresponding to the one or more transactions indicating an updating process which is yet to be reflected in the database, to the another computer based on the list.

\* \* \* \* \*